(12) United States Patent
Krochmal et al.

(10) Patent No.: US 9,853,719 B2
(45) Date of Patent: Dec. 26, 2017

(54) DISCOVERY OF NEARBY DEVICES FOR FILE TRANSFER AND OTHER COMMUNICATIONS

(71) Applicant: Apple Inc., Cupertino, CA (US)

(72) Inventors: Marc J. Krochmal, Cupertino, CA (US); Christopher J. Edmonds, Cupertino, CA (US); Christopher C. Jensen, Cupertino, CA (US); Augustin Prats, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 273 days.

(21) Appl. No.: 14/037,272

(22) Filed: Sep. 25, 2013

(65) Prior Publication Data

US 2014/0362728 A1 Dec. 11, 2014

Related U.S. Application Data

(60) Provisional application No. 61/832,886, filed on Jun. 9, 2013.

(51) Int. Cl.
*H04B 7/26* (2006.01)
*H04W 52/02* (2009.01)
(Continued)

(52) U.S. Cl.
CPC .............. *H04B 7/26* (2013.01); *H04W 8/005* (2013.01); *H04W 12/02* (2013.01);
(Continued)

(58) Field of Classification Search
CPC ........ H04B 7/26; H04W 8/005; H04W 12/02; H04W 52/0251; H04W 52/028; H04W 76/00
(Continued)

(56) References Cited

U.S. PATENT DOCUMENTS

| 7,958,347 B1 * | 6/2011 | Ferguson ................ H04L 9/321 713/155 |
| 8,385,913 B2 | 2/2013 | Proctor, Jr. et al. |

(Continued)

OTHER PUBLICATIONS

Author Unknown, "Specification of the Bluetooth System"; Covered Core Package version 4.0 (vol. 3); Publication date: Jun. 30, 2010; pp. 1-22, and pp. 252-264.

*Primary Examiner* — Andrew Chriss
*Assistant Examiner* — Ellen Kirillova
(74) *Attorney, Agent, or Firm* — Downey Brand LLP

(57) ABSTRACT

Methods and apparatuses for wireless communication devices to discover each other and share information are described. Wireless communication devices transmit and receive messages to identify compatible wireless communication devices. The messages include indicators for a communication service and one or more user identification values. A scanning wireless communication device identifies a message from a broadcasting wireless communication device that satisfies a set of matching filter criteria and extracts user identification values from the message. The scanning wireless communication device compares the extracted user identification values to a local set of user identification values. When an extracted user identification value from the message matches a user identification value in the local set of user identification values, the scanning wireless communication device establishes a connection to the broadcasting wireless communication device according to the communication service indicated in the message.

20 Claims, 10 Drawing Sheets

(51) Int. Cl.
*H04W 12/02* (2009.01)
*H04W 8/00* (2009.01)
*H04W 84/12* (2009.01)
*H04W 92/18* (2009.01)

(52) U.S. Cl.
CPC ..... *H04W 52/028* (2013.01); *H04W 52/0251* (2013.01); *H04W 84/12* (2013.01); *H04W 92/18* (2013.01); *Y02B 60/50* (2013.01)

(58) Field of Classification Search
USPC ........................................................ 370/254
See application file for complete search history.

(56) References Cited

U.S. PATENT DOCUMENTS

| | | | |
|---|---|---|---|
| 2003/0005132 A1* | 1/2003 | Nguyen et al. ................ 709/229 |
| 2004/0090930 A1* | 5/2004 | Lee .................... H04L 63/083 |
| | | | 370/328 |
| 2005/0215287 A1* | 9/2005 | Efland ................... H04B 1/406 |
| | | | 455/562.1 |
| 2008/0031205 A1* | 2/2008 | Kahola et al. ................ 370/338 |
| 2010/0120362 A1 | 5/2010 | Walley et al. |
| 2011/0007637 A1 | 1/2011 | Chen et al. |
| 2011/0167182 A1* | 7/2011 | Palin et al. ................... 710/105 |
| 2012/0077506 A1* | 3/2012 | Wietfeldt et al. ............ 455/450 |
| 2012/0322466 A1 | 12/2012 | Das et al. |
| 2013/0109323 A1 | 5/2013 | Ruutu et al. |
| 2013/0288659 A1* | 10/2013 | Hrabak ................. H04W 4/001 |
| | | | 455/419 |
| 2014/0223537 A1* | 8/2014 | Islam et al. ..................... 726/12 |

\* cited by examiner

DISCOVERY OF NEARBY DEVICES FOR FILE TRANSFER AND OTHER COMMUNICATIONS

CROSS-REFERENCE TO RELATED APPLICATIONS

This application claims the benefit of U.S. Provisional Application No. 61/832,886, filed Jun. 9, 2013 and entitled "DISCOVERY OF NEARBY DEVICES FOR FILE TRANSFER AND OTHER COMMUNICATIONS", which is incorporated by reference herein in its entirety for all purposes.

TECHNICAL FIELD

The described embodiments relate generally to wireless communications, and more particularly to discovering nearby wireless communication devices and to communicating information to/from discovered wireless communication devices.

BACKGROUND

Wireless communication devices can include capabilities to communicate using one or more different radio access technologies (RATs) in accordance with various wireless communication protocols. With an increasing array of functionalities, which can generate, receive, process, and/or store data in various forms, wireless communication devices can also serve as substitutes for more general purpose computing devices. As such, a user of a wireless communication device can seek to connect and communicate with other wireless communication devices directly, e.g., to share files, media, applications, or other data available on the wireless communication device. Wireless communication devices can discover nearby wireless communication devices, e.g., by having one wireless communication device actively enable a "locate" function that broadcasts an intention to establish a shared connection, and by actively having an additional wireless communication device enable a "scan" function to listen for broadcast messages. Despite the considerable efforts in this domain, current methods for discovering wireless communication devices with which to establish connections and share information can be improved.

SUMMARY OF THE DESCRIBED EMBODIMENTS

Methods and apparatuses for wireless communication devices to discover each other, to establish connections to each other, and to share information with each other are described. In representative embodiments, wireless communication devices use one or more wireless communication protocols to transmit and receive messages to identify compatible wireless communication devices with which to establish connections and to share information. The messages include indicators for a communication service and one or more user identification values. A scanning wireless communication device filters messages received from one or more broadcasting wireless communication devices according to a set of matching filter criteria including comparing values contained in fields of the received messages. The scanning wireless communication device identifies a message from a broadcasting wireless communication device that satisfies the set of matching filter criteria and extracts user identification values from the message. The scanning wireless communication device compares the extracted user identification values, which are associated with the broadcasting wireless communication device and/or a user thereof, to at least a portion of a local set of user identification values stored in and/or associated with the scanning wireless communication device. When an extracted user identification value from the message matches a user identification value in the local set of user identification values, the scanning wireless communication device establishes a connection to the broadcasting wireless communication device according to the communication service indicated in the message. In some embodiments, the user identification values are broadcast in an encrypted form. In some embodiments, messages are communicated according to a wireless personal area network communication protocol, and the communication service uses a connection according to a wireless local area network communication protocol.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

DETAILED DESCRIPTION OF SELECTED EMBODIMENTS

Figure 1:
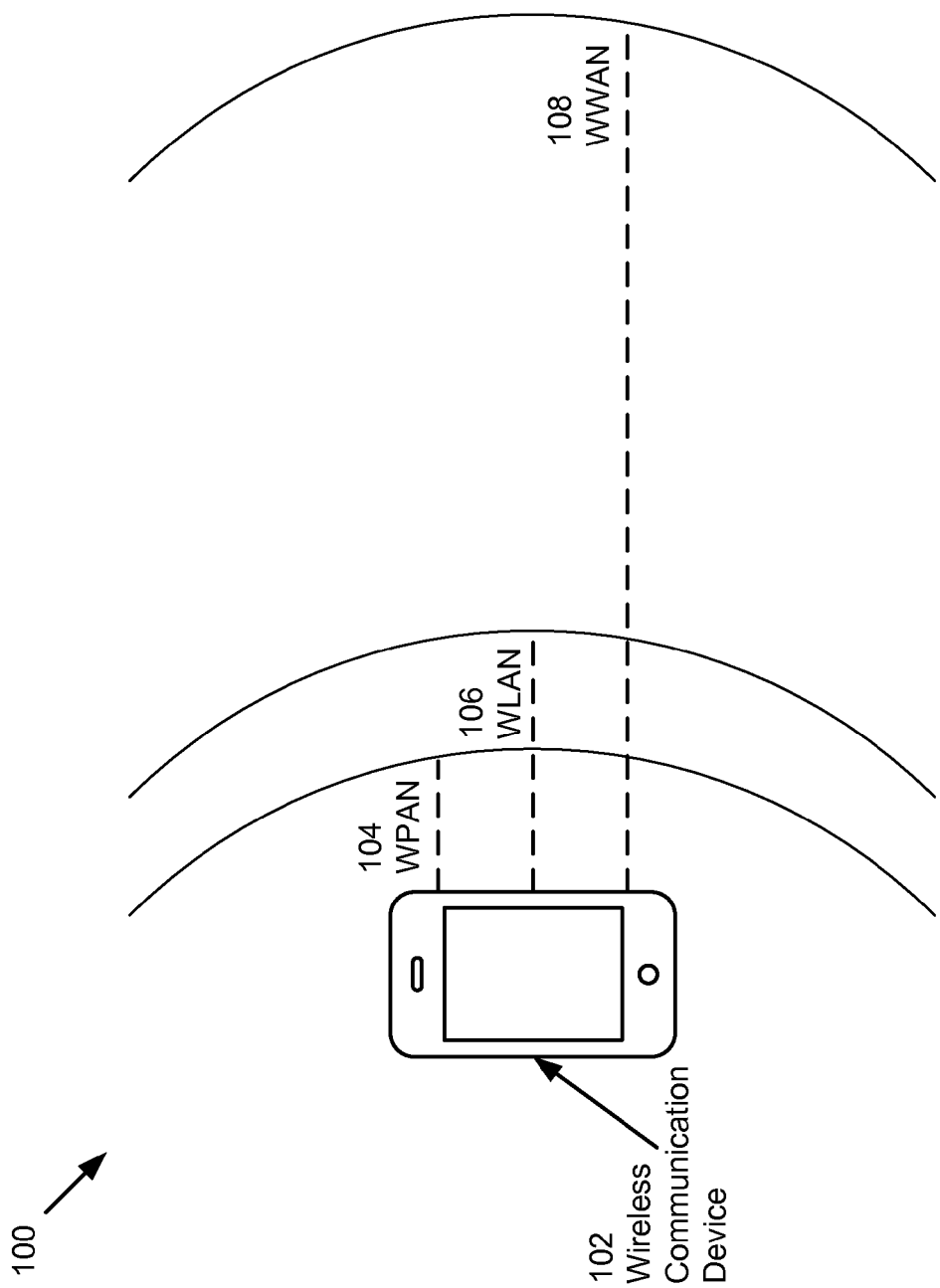
FIG. 1 illustrates a wireless communication device capable of operating in one or more different wireless communication networks in accordance with some embodiments.

The described embodiments relate generally to wireless communications, and more particularly to discovering nearby wireless communication devices and to communicating information to/from discovered wireless communication devices.

Wireless communication devices can incorporate wireless circuitry for multiple different radio access technologies (RATs) to provide connections according to different wireless communication protocols. A wireless communication device can include wireless circuitry (including combinations of hardware and software) to support a wireless personal area network (WPAN) communication protocol, e.g., as standardized by the Bluetooth® special interest group (SIG), and a wireless local area network (WLAN) communication protocol, e.g., as standardized by the Institute of Electrical and Electronics Engineers (IEEE) 802.11 working group (i.e., IEEE 802.11a/b/g/n/ac, IEEE 802.11-2012, and/or other IEEE 802.11 communication protocols) and promoted by the Wi-Fi Alliance. A broadcasting wireless communication device can search for nearby wireless communication devices with which to establish a connection and share data by broadcasting messages that indicate an intention to establish a connection and/or to share data between wireless communication devices. A scanning wireless communication device can scan for broadcast messages and can filter received messages according to a set of matching filter criteria to limit processing requirements for handling received messages. The set of matching filter criteria can provide for accepting messages from wireless communication devices based on information contained in the messages. The information used for filtering received messages can include device identification (e.g., properties of the wireless communication device from which the message originates), service identification (e.g., a particular connection and/or data sharing service indicated in the message), user identification (e.g., information in the message matching to a contact list and/or address book in the receiving wireless communication device), or a combination of these. At least a portion of information communicated in broadcast messages can be communicated and compared using an encrypted form to secure sensitive personal information when broadcasting messages that request to establish a connection and/or share data with another wireless communication device. In some embodiments, scanning wireless communication devices can scan for messages using a background process. Broadcasting wireless communication devices can broadcast messages according to a WPAN communication protocol, e.g., Bluetooth Low Energy (BTLE). Upon reception of a broadcast message that "passes" a set of matching filter criteria, a scanning wireless communication device can enable dormant wireless circuitry in the scanning wireless communication device, e.g., WLAN wireless circuitry, in order to establish a higher layer data sharing connection to the broadcasting wireless communication device. In some embodiments, broadcast messages can include information that may be used to assist in establishing the higher layer data sharing connection. In some embodiments, the methods and apparatuses described herein can provide for discovering "compatible" nearby wireless communication devices with which to establish peer-to-peer wireless connections and share data. In some embodiments, a wireless communication device can be considered "compatible" when broadcast messages from the wireless communication device include information that identifies the broadcasting wireless communication device as "known" to the receiving wireless communication device.

A wireless communication device can discover "compatible" wireless communication devices and establish connections to discovered wireless communication devices in order to provide specific services, e.g., for attaching peripheral wireless communication devices to a main wireless communication device through a WPAN or for establishing a peer-to-peer wireless connection. A WPAN communication protocol can be used for discovery of nearby wireless communication devices, e.g., by using a background scanning process in accordance with the WPAN communication protocol. A representative WPAN communication protocol can include BTLE.

The wireless communication device can also include wireless circuitry to support a wireless local area network (WLAN) according to a WLAN communication protocol, e.g., a Wi-Fi communication protocol. In some embodiments, a wireless communication device can incorporate wireless circuitry to support communication through both a WPAN and a WLAN, with the WPAN used for scanning and device discovery followed by the WLAN used for information transfer.

A WLAN can provide a centrally managed connection between two different wireless communication devices through a dedicated access point (AP), the AP acting as a common centralized hub through which communication occurs. Alternatively, the two different wireless communication devices can establish a direct peer-to-peer (P2P) WLAN connection between each other without using a dedicated AP, according to a standardized or proprietary wireless communication protocol, e.g., by having either wireless communication device act as a limited AP and/or through other techniques. The direct P2P WLAN connection can provide for communication directly between the two different wireless communication devices, which can be used for communication services that provide various types of information data transfer (e.g., file sharing, printing, and/or media streaming). Representative direct P2P WLAN connections can include a Wi-Fi Direct connection, an Apple Wireless Direct Link (AWDL) connection, and an IEEE 802.11 ad hoc mode connection; and representative communication services, which may be used to communicate data using the direct P2P WLAN connections, include AirDrop®, AirPrint™, and AirPlay® (provided by software on products of Apple Inc.), and/or other communication services.

A first "scanning" wireless communication device can include WPAN wireless circuitry, which can be configured to scan for messages broadcast by other wireless communication devices. In a representative embodiment, the WPAN wireless circuitry can use a Bluetooth Low Energy (BTLE) wireless communication protocol, e.g., as defined as part of a Bluetooth 4.X or later specification published by the Bluetooth SIG. The WPAN wireless circuitry can be enabled continuously (and/or configured to operate based on a user preference or based on other power state dependent conditions) to provide a "background" scanning capability to the first scanning wireless communication device to listen for WPAN messages from compatible wireless communication devices that broadcast messages indicating availability of one or more communication services. In an embodiment, a second "broadcasting" wireless communication device can broadcast a WPAN message, e.g., a BTLE advertising message (also referred to as an advertising packet) on one or more advertising channels according to the BTLE wireless communication protocol. The BTLE advertising messages broadcast by the second broadcasting wireless communication device can include a set of information by which the first scanning wireless communication device can filter the advertising messages to determine whether to initiate establishing a connection and/or sharing data with the second broadcasting wireless communication device. In an embodiment, the BTLE advertising message broadcast by the second broadcasting wireless communication device can include a manufacturing identification field that identifies a particular company associated with the second broadcasting wireless communication device. In an embodiment, the manufacturing identification field can include a unique numeric identifier specified by the Bluetooth SIG. In an embodiment in which the manufacturer of the second broadcasting wireless communication device is Apple Inc., the manufacturing identification field can have a value of 0x004C, which corresponds to a manufacturing company incorporated as Apple Inc. In an embodiment in which the manufacturer of the second broadcasting wireless communication device is a specific company, the manufacturing identification field can have a particular value that corresponds to the specific company. The first scanning wireless communication device can scan for BTLE advertising messages that include one or more particular values in the manufacturing identification field and can ignore other BTLE advertising messages that do not include the one or more particular values in the manufacturing identification field. In an embodiment, the first scanning wireless communication device can scan for BTLE advertising messages that includes a value in the manufacturing identification field that matches a particular value for a specific manufacturing company associated with the first scanning wireless communication device. In an embodiment, WPAN wireless circuitry in the first scanning wireless communication device can scan for and identify BTLE advertising messages having one or more particular values in the manufacturing identification field, while an application processor in the first scanning wireless communication device can be powered down (or minimally powered) to reduce power consumption by the first scanning wireless communication device while in the scanning mode.

The broadcast BTLE advertising message can also include a communication service identification field that can specify a particular communication service that the second broadcasting wireless communication device can provide to the first scanning wireless communication device. The first scanning wireless communication device can scan for BTLE advertising messages that include one or more particular values in the communication service identification field and can ignore other BTLE advertising messages that do not include those one or more particular values in the communication service identification field. In a representative embodiment, the communication service identification field can include a particular value that specifies a particular communication service offered by the second broadcasting wireless communication device to the first scanning wireless communication device, e.g., an AirDrop file sharing service for data transfer between two compatible wireless communication devices. In an embodiment, WPAN wireless circuitry of the scanning wireless communication device can scan for and identify BTLE advertising messages having one or more particular values in the communication services identification field, while the application processor can remain dormant and/or minimally powered. In a representative embodiment, the WPAN wireless circuitry can scan for a combination of one or more particular values in the manufacturing identification field and one or more particular values in the communication services identification field. The scanning wireless communication device can ignore BTLE advertising messages that do not match particular values for the manufacturing identification field and/or particular values for the communication service identification field. In an embodiment, BTLE advertising messages that match the combination of one or more particular values for both the manufacturing identification field and the communication service identification field can be transferred from the WPAN wireless circuitry to an application processor in the scanning wireless communication device that can further analyze contents of the BTLE advertising messages. In some embodiments, the WPAN wireless circuitry can extract additional information and/or process extracted additional information contained in select BTLE advertising messages before communicating all or a portion of the BTLE advertising messages (and/or information extracted therefrom) to the application processor.

The broadcast BTLE advertising message can also include a user identification field that can provide user information that identifies a user of the second broadcasting wireless communication device, the second broadcasting wireless communication device, or both the user of the second broadcasting wireless communication device and the second broadcasting wireless communication device. In an embodiment, the user information included in the broadcast BTLE advertising message can be provided in an encrypted form, e.g., as a set of cryptographic hashes of user information available in the second broadcasting wireless communication device. In an embodiment, the application processor of the first scanning wireless communication device can extract a set of encrypted user identification values associated with the second broadcasting wireless communication device from the broadcast BTLE advertising message. In a representative embodiment, the user identification field can include a set of encrypted email addresses and/or a set of encrypted mobile device numbers that can identify the user of the second broadcasting wireless communication device or the second broadcasting wireless device. In an embodiment, the user identification field includes cryptographic hashes of one or more email address and/or one or more mobile device numbers and/or one or more login identifiers. In an embodiment, the user of the second broadcasting wireless communication device can specify the set of user identification information to include in the broadcast BTLE advertising message. In another embodiment, a combination of hardware and/or software in the second broadcasting wireless communication device automatically selects a set of user identification information available in and/or associated with the second wireless communication device to encrypt and include in the user identification field of broadcast BTLE advertising messages.

The first scanning wireless communication device can extract from the broadcast BTLE advertising message the encrypted information provided in the user identification field provided by the second broadcasting wireless communication device and compare the extracted information to a set of similar encrypted information stored in (and/or associated with) the first scanning wireless communication device (and/or with a user thereof). In some embodiments, the encrypted information for the first scanning wireless communication device (and/or for a user thereof) includes a set of cryptographic hashes of one or more email addresses, phone numbers, login identifiers, or a combination of these associated with the first scanning wireless communication device. In some embodiments, encrypted information is a set of cryptographic hashes of information stored in a contacts list and/or in an address book stored in and/or associated with the first scanning wireless communication device (and/or with the user thereof). In an embodiment, extraction of the encrypted information from the broadcast BTLE advertising message and comparison of the extracted encrypted information to locally stored and/or associated encrypted information can occur in the application processor of the first scanning wireless communication device. In some embodiments, encrypted information can be extracted and compared only for broadcast BTLE advertising messages that match particular values for the manufacturing identification field and/or for the communication service identification field. In another embodiment, extraction and comparison of the encrypted user identification information can occur, at least in part, in the WPAN wireless circuitry of the first scanning wireless communication device.

When a portion of the encrypted information extracted from the broadcast BTLE advertising message (which is associated with the second broadcasting wireless communication device) and a portion of the encrypted information stored in (and/or associated with) the first scanning wireless communication device matches a set of matching filter criteria, the first scanning wireless communication device can enable WLAN wireless circuitry in the first scanning wireless communication device, e.g., in order to communicate further with the second broadcasting wireless communication device to establish a WLAN connection and to transfer information (or provide another compatible wireless communication service through the established WLAN connection). The wireless communication service can be provided in accordance with a WLAN wireless communication protocol through a WLAN connection established between the first scanning wireless communication device (that scanned for advertising messages using a WPAN wireless communication protocol) and the second broadcasting wireless communication device (that broadcast advertising messages using the WPAN wireless communication protocol.) In an embodiment, the first scanning wireless communication device can establish a peer-to-peer WLAN connection directly to the second broadcasting wireless communication device. In an embodiment, the second broadcasting wireless communication device can transfer information to the first scanning wireless communication device using the particular communication service specified in the broadcast BTLE advertising message over the established peer-to-peer WLAN connection. In a representative embodiment, the peer-to-peer WLAN connection operates in accordance with a Wi-Fi wireless communication protocol.

As described herein, a WPAN wireless communication protocol can provide for discovering compatible nearby wireless communication devices, and a WLAN wireless communication protocol can provide for transferring data between compatible wireless communication devices. BTLE advertising messages received by a first scanning wireless communication device can include information by which to identify a second broadcasting wireless communication device (and/or a user thereof) in order to determine whether to establish a connection and/or a data sharing service between them. In some embodiments, the information included in the BTLE advertising messages can include encrypted versions of information contained in a contact list and/or an address book of the second broadcasting wireless communication device, and the first scanning wireless communication device can compare information in the BTLE advertising messages to local encrypted versions of similar information, e.g., information in a local contact list and/or address book of the first scanning wireless communication device. In an embodiment, a BTLE advertising message can include information about the WLAN configuration of a second broadcasting wireless communication device to provide to a first scanning wireless communication device to assist in establishing a WLAN connection between them.

FIG. 1 illustrates a set of overlapping wireless networks 100 for a wireless communication device 102. The wireless communication device 102 can include a combination of hardware and software to provide wireless connections over one or more different wireless networks alone, separately, or in combination. The wireless communication device 102 can include hardware and software to provide communication over a wireless personal area network (WPAN) 104. WPAN connections can be provided for connecting the wireless communication device 102 to many different types of devices, including but not limited to peripheral devices, e.g., headsets, earpieces, supplemental display devices, and supplemental input/output devices, as well as to other wireless communication devices 102. A representative WPAN 104 can operate in accordance with a WPAN communication protocol specified by the Bluetooth SIG. The wireless communication device 102 can also include hardware and software to provide communication over a wireless local area network (WLAN) 106. The wireless communication device 102 can include separate hardware and software for the WPAN 104 and the WLAN 106. Both the WPAN 104 and WLAN 106 can operate as "local" networks. The wireless communication device 102 can include additional hardware and software to provide a wireless wide area network (WWAN) 108 capability, e.g., to interconnect with one or more cellular networks.

Figure 2:
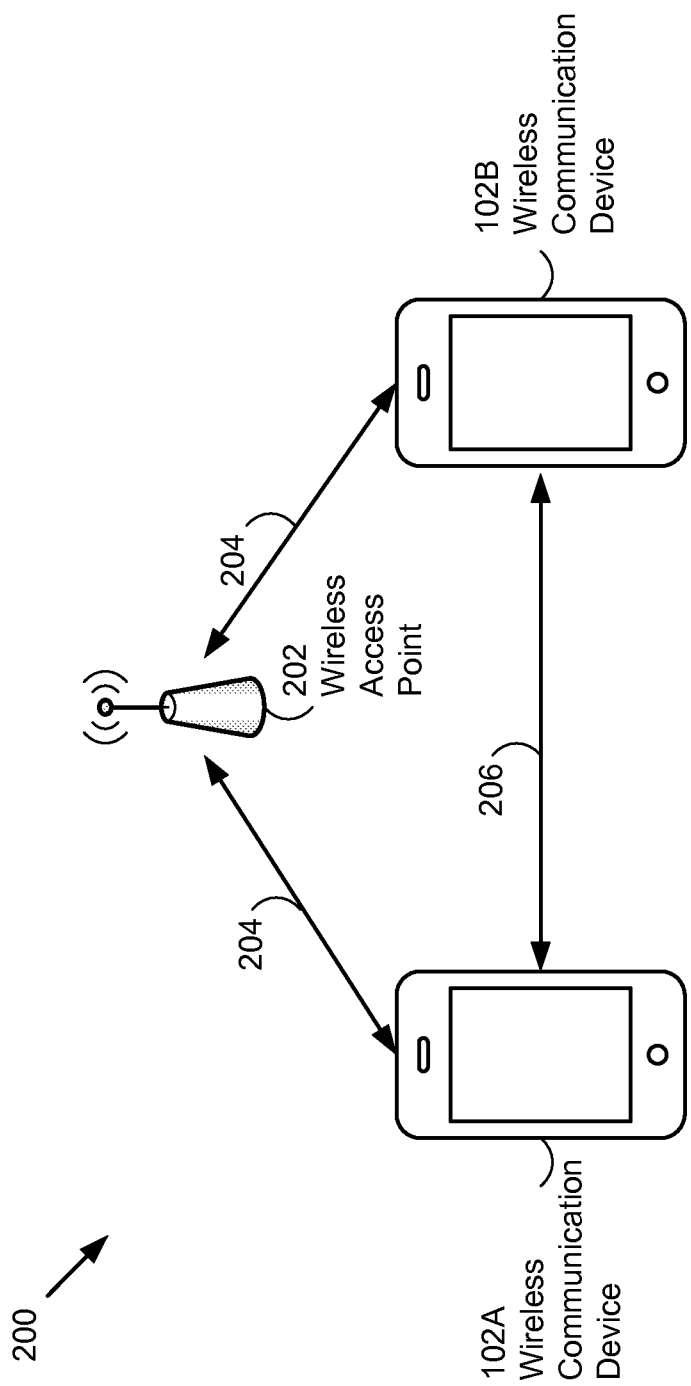
FIG. 2 illustrates representative wireless local area network communication paths between two different wireless communication devices in accordance with some embodiments.

FIG. 2 illustrates a set 200 of different WLAN 106 connections that can exist between two different wireless communication devices 102A and 102B. Each wireless communication device 102A/B can be connected through a wireless access point 202 using connections 204 between the wireless communication devices 102A/B and the wireless access point 202. The wireless access point 202 can provide a secure and fully functional WLAN 106. Two different wireless communication devices 102A/B can also establish a direct peer-to-peer (P2P) WLAN connection 206 with each other. A peer-to-peer wireless connection can allow a wireless communication device 102A/B to communicate for specific purposes with minimal setup negotiation required. Peer-to-peer WLAN connections 206 between wireless communication devices 102A/B can be useful as more computing devices include WLAN radio frequency (RF) capability, e.g., computers, printers, scanners, and cameras, in addition to mobile computing devices. Communication over a WPAN connection and over a WLAN connection can occur directly between wireless communication devices 102A/B that support P2P wireless connections without requiring a stand-alone wireless access point 202.

Figure 3:
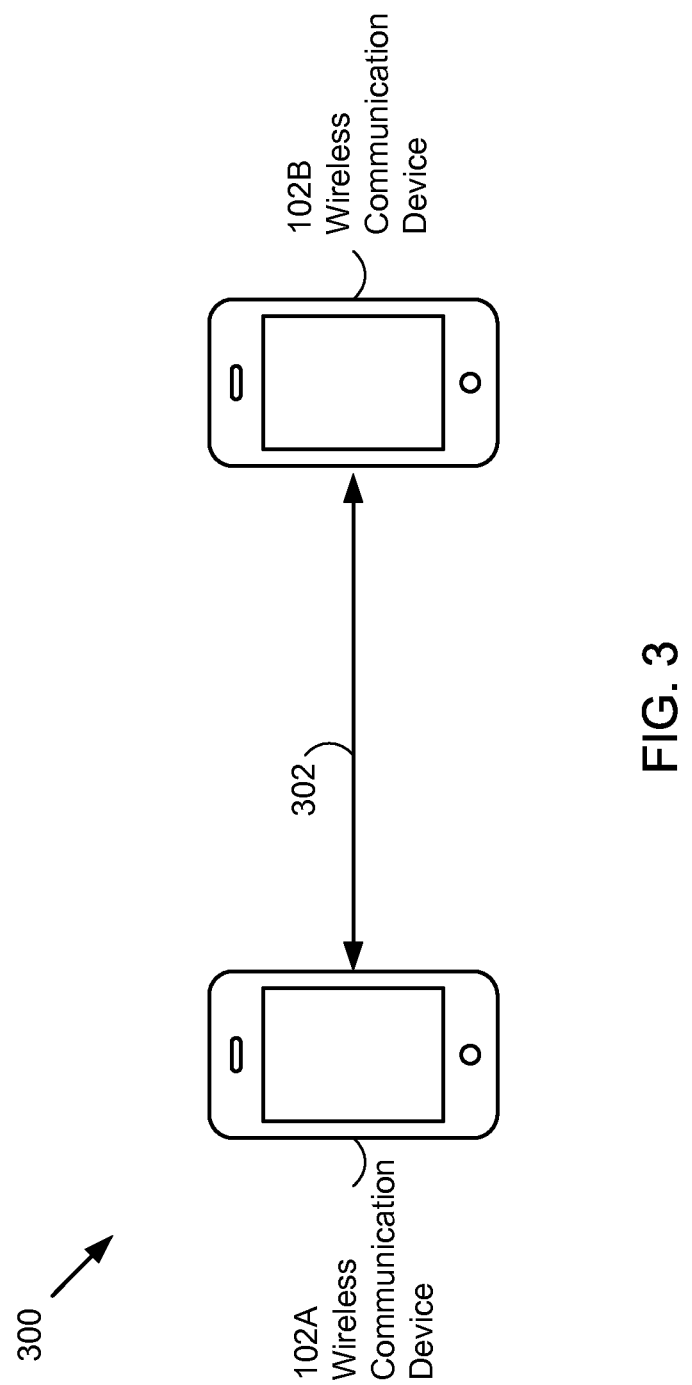
FIG. 3 illustrates a direct connection using one or more different radio access technologies between two different wireless communication devices in accordance with some embodiments.

FIG. 3 illustrates a simple form of a peer-to-peer wireless local area network 300 in which two wireless communication devices 102A and 102B can communicate directly with each other through a wireless connection 302 without relying on an existing access point wireless network infrastructure. The two wireless communication devices 102A and 102B can communicate directly with each other to establish the wireless connection 302 of the peer-to-peer WLAN 300, e.g., by using at least in part a WPAN wireless communication protocol as described hereinabove. The wireless communication devices 102A and 102B can use the WPAN wireless communication protocol to broadcast wireless communication service capabilities to each other, e.g., using "advertising" messages such as BTLE advertising messages according to a BTLE wireless communication protocol. A wireless communication device, e.g., wireless communication device 102A, can also scan for advertising messages using WPAN wireless circuitry in the background to locate compatible wireless communication devices 102, e.g. wireless communication device 102B, that can offer wireless communication services with which to connect and transfer information.

Figure 4:
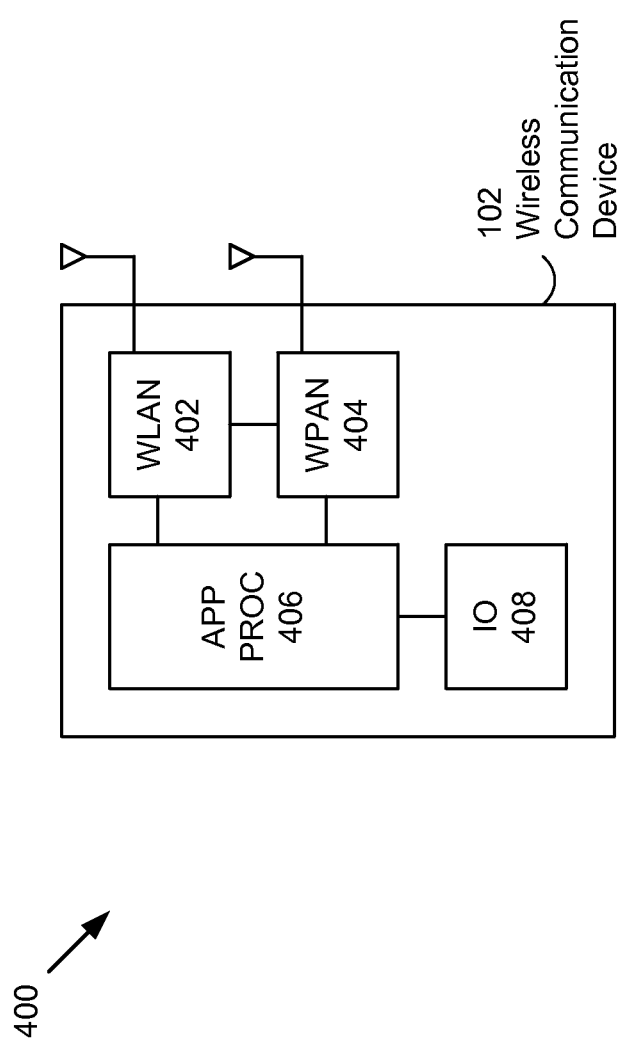
FIG. 4 illustrates elements of a representative wireless communication device that can support communication through multiple wireless networks in accordance with some embodiments.

FIG. 4 illustrates a representative set of interconnected blocks (processing elements) 400 in a wireless communication device 102. The wireless communication device 102 can include wireless circuitry that supports different wireless communication protocols and/or radio access technologies. In some embodiments, the wireless communication device 102 can include separate wireless circuitry for different wireless communication protocols and/or radio access technologies. In some embodiments, the wireless communication device 102 can include a combined, integrated block of wireless circuitry that can support a combination of different wireless communication protocols and/or different radio access technologies. A representative wireless communication device 102 can include WLAN wireless circuitry 402 coupled to one or more antennas and WPAN wireless circuitry 404 coupled to one or more antennas. In some embodiments, the WLAN wireless circuitry 402 and the WPAN wireless circuitry 404 are coupled to separate antennas and can use different hardware processing elements. In some embodiments, the WLAN wireless circuitry 402 and the WPAN wireless circuitry 404 are coupled to one or more common antennas (not shown) and can use a common set of hardware processing elements. The WLAN wireless circuitry 402 and the WPAN wireless circuitry 404 can include transmitters and receivers to provide signal processing of radio frequency wireless signals formatted according to wireless communication protocols, e.g., a Wi-Fi WLAN wireless communication protocol and a Bluetooth Low Energy WPAN wireless communication protocol respectively. In some embodiments, the WLAN wireless circuitry 402 and the WPAN wireless circuitry 404 can include components such as: processors and/or specific-purpose DSP circuitry for implementing functionality such as, but not limited to, baseband signal processing, physical layer processing, data link layer processing, and/or other functionality; one or more digital to analog converters (DACs) for converting digital data to analog signals; one or more analog to digital converters (ADCs) for converting analog signals to digital data; radio frequency (RF) circuitry (e.g., one or more amplifiers, mixers, filters, phase lock loops (PLLs), and/or oscillators); and/or other components. The WLAN wireless circuitry 402 and the WPAN wireless circuitry 404 can be connected to additional processing circuitry in the wireless communication device 102 including an application processor 406 that can provide higher layer processing, e.g., application and transport layer protocol processing. The application processor 406 can be connected to an input/output (IO) block 408 through which information can be displayed to a user of the wireless communication device 102 and also through which the user of the wireless communication device 102 can enter information. In some embodiments, a common IO block 408 can be used both to display information to the user and to accept user inputs. In an embodiment, the application processor 406 can control functionality performed by all or portions of the WLAN and WPAN wireless circuitries 402/404. The application processor 406 can power down portions of the WLAN and WPAN wireless circuitries 402/404 to reduce power consumption based on various operating conditions, e.g., when idle and/or operating solely on battery power and/or based of expiration of one or more dormancy timers. In an embodiment, the application processor 406 can power down the WLAN wireless circuitry 402 and enable all or part of the WPAN wireless circuitry 404, e.g., a receiver signaling processing chain of the WPAN wireless circuitry 404, in order to scan for messages using a WPAN wireless communication protocol. In an embodiment, the WPAN wireless circuitry 404 can operate according to a BTLE wireless communication protocol.

The WPAN wireless circuitry 404 can scan for advertising messages that can include multiple identification fields, through which the WPAN wireless circuitry 404 can locate additional wireless communication devices 102 that can offer wireless communication services. The WPAN wireless circuitry 404 can alert the application processor 406 when receiving one or more advertising messages from a "compatible" wireless communication device 102. In some embodiments, "compatibility" between a first scanning wireless communication device 102 and a second broadcasting wireless communication device 102 can be determined by examining information contained in the advertising messages. The application processor 406 can operate in a power reduced or dormant state while the WPAN wireless circuitry 404 scans for advertising messages using the WPAN wireless communication protocol. When obtaining one or more advertising messages that match a set of filter matching criteria, the WPAN wireless circuitry 404 can provide an indication to the application processor 406, which can "transition" from the power reduced or dormant state and can provide further processing of information included in the advertising messages. The WPAN wireless circuitry 404 can transfer information extracted from the one or more advertising messages to the application processor 406 to determine if the wireless communication devices 102 from which the advertising messages were received are compatible with the particular wireless communication device 102 that received the advertising messages. When locating a compatible wireless communication device 102, the application processor 406 can enable the WLAN wireless circuitry 402 in order to establish a WLAN connection to the compatible wireless communication device 102. In some embodiments, the WLAN wireless circuitry 402 (or a portion thereof) can be in a dormant or power reduced state, and the application processor 406 can "transition" the WLAN wireless circuitry 402 (or portion thereof) before establishing a higher data throughput connection. In some embodiments, the application processor 406 provides information extracted from the advertising messages to the WLAN wireless circuitry 402 to assist with establishing a WLAN connection to the compatible wireless communication device 102. In some embodiments, the WPAN wireless circuitry 404 passes information extracted from the advertising messages directly to the WLAN wireless circuitry 402. In some embodiments, the WPAN wireless circuitry 404 and the WLAN wireless circuitry 402 communicate directly with each other in order to coordinate a transition from a scanning mode that uses a WPAN wireless communication protocol to a data transfer mode that uses a WLAN wireless communication protocol. In some embodiments, the WPAN wireless circuitry 404 and the WLAN wireless circuitry 402 comprise portions of a combined block of wireless circuitry that provides for communication according to one or more WPAN and/or WLAN wireless communication protocols.

In some embodiments, the application processor 406 compares information contained in one or more of the advertising messages to local information stored in and/or associated with the wireless communication device 102. In some embodiments, the wireless communication device 102 includes non-volatile storage (not shown) in which can be stored all or portions of information with which to filter advertising messages according to a set of matching filter criteria. In some embodiments, the non-volatile storage stores all or portions of a local set of user identification information associated with the wireless communication device 102 and/or a user thereof. In some embodiments, the application processor 406 compares user identification information extracted from received advertising messages to all or portions of the local set of user identification information, e.g., to determine compatibility between the wireless communication device 102 that received the advertising message and the wireless communication device 102 that broadcast the advertising message. In some embodiments, the user identification information included in the advertising message can be formatted in an encrypted form. In some embodiments, the set of local user identification information can likewise be formatted in an encrypted form. The application processor 406 can compare the extracted user identification information to the local set of user identification information by comparing encrypted forms thereof, in some embodiments. The local set of user identification information can be all or portions of a contact list and/or an address book stored in and/or associated with the wireless communication device 102. In some embodiments, comparison of the user identification information is performed at least in part by portions of wireless circuitry (e.g., WPAN wireless circuitry 404 and/or WLAN wireless circuitry 402) in the wireless communication device 102.

Figure 5:
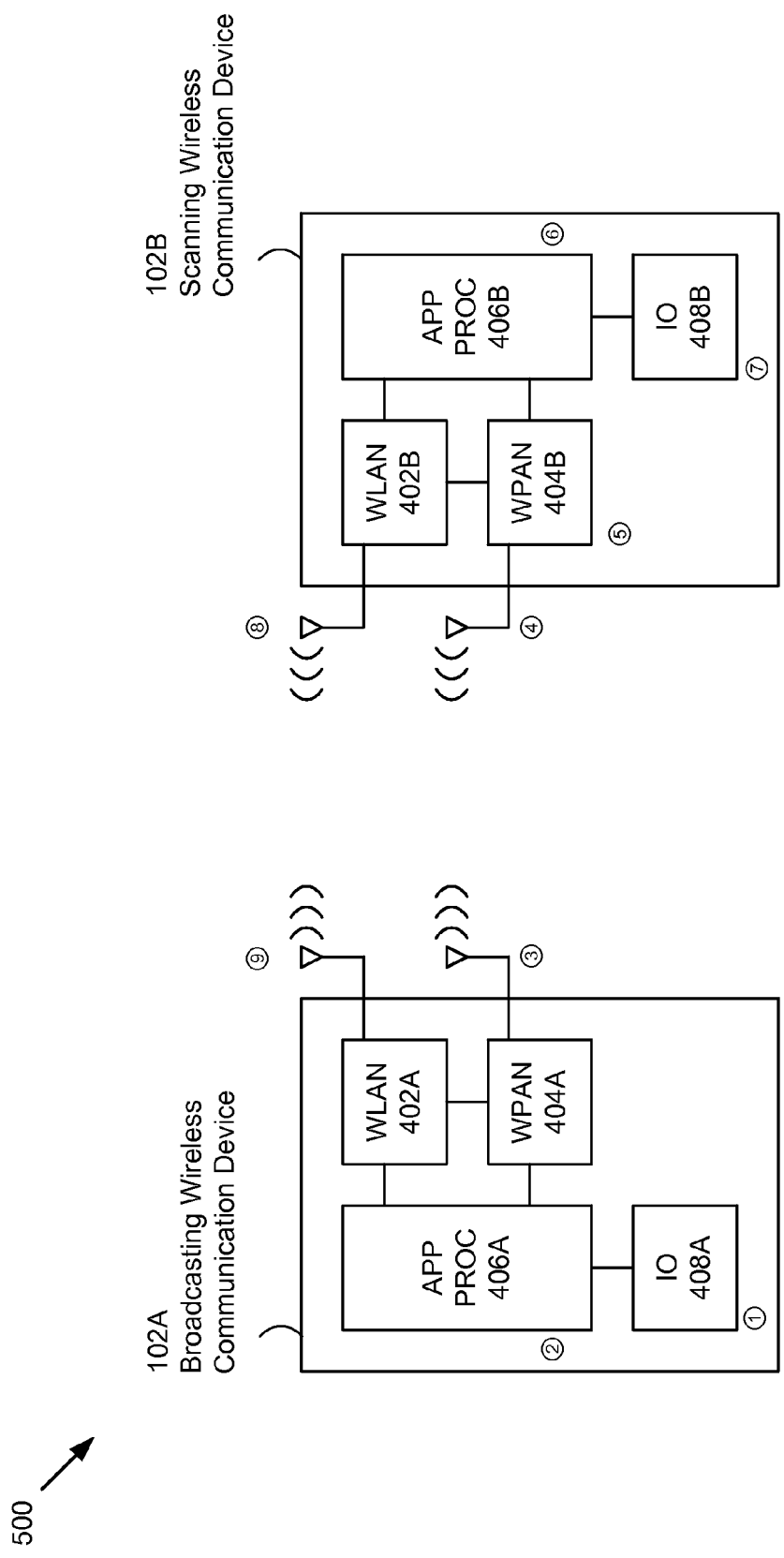
FIG. 5 illustrates a sequence of actions performed by two wireless communication devices using two different wireless networks in accordance with some embodiments.

FIG. 5 illustrates a sequence of actions 500 that can occur between two wireless communication devices 102A and 102B in order to locate compatible wireless communication devices 102 between which to share information. The two wireless communication devices 102A and 102B can be referred to as a scanning wireless communication device 102B that can passively scan for messages from other wireless communication devices 102, including, e.g., from a broadcasting wireless communication device 102A that can transmit advertising messages as described herein. The WLAN wireless circuitry 402B and the WPAN wireless circuitry 404B in the scanning wireless communication device 102B can be configured according to software, hardware, operating conditions, and/or user preferences. In some embodiments, aspects of enabling operating states of the WLAN wireless circuitry 402B and the WPAN wireless circuitry 404B in the scanning wireless communication device 102B can be determined by operating system software of the application processor 406B and/or by inputs provided by a user of the scanning wireless communication device 102B, e.g., through the input/output (IO) block 408B.

In an embodiment, one or more settings for wireless communication protocols (and accordingly the hardware and/or software that supports the wireless communication protocols) can be obtained from a user of the scanning wireless communication device 102B through the IO block 408B. In an embodiment, the user can enable separate use of the WLAN wireless circuitry 402B and of the WPAN wireless circuitry 404B, e.g., by providing one or more indications through the IO block 408B of the scanning wireless communication device 102B. The user inputs can be interpreted by the application processor 406B, which can configure the WPAN wireless circuitry 404B and/or the WLAN wireless circuitry 402B according to the user inputs. In some embodiments, the WLAN wireless circuitry 402B can be enabled but operate in a power reduced mode or in a dormant state until required. In an embodiment, the WPAN wireless circuitry 404B can be enabled but operate in a power efficient mode, e.g., by enabling a receive signal chain of the WPAN wireless circuitry 404B to scan for messages according to a particular wireless communication protocol. In an embodiment, the receive signal chain of the WPAN wireless circuitry 404B can operate in accordance with a BTLE wireless communication protocol. In an embodiment, the WPAN wireless circuitry 404B can scan for messages using the BTLE wireless communication protocol only when the user enables a Bluetooth wireless communication protocol. In another embodiment, the WPAN wireless circuitry 404B can scan for BTLE messages as a default configuration of operating system software of the scanning wireless communication device 102B. The scanning wireless communication device 102B can scan for BTLE advertising messages as a background process. In some embodiments, scanning can occur irrespective of a powered state of the scanning wireless communication device 102B. In some embodiments, the scanning wireless communication device 102B can scan for BTLE advertising messages when operating on battery power and not connected to an external power supply. In some embodiments, the scanning wireless communication device 102B can scan for BTLE advertising messages when a display of the scanning wireless communication device 102B is off. In some embodiments, a user of the scanning wireless communication device 102B can configure under what conditions the WPAN wireless circuitry 404B can scan for BTLE advertising messages.

A user of the broadcasting wireless communication device 102A can provide an indication through the IO block 408A of availability of a wireless communication service, e.g., by initiating an inquiry for nearby compatible wireless communication devices 102 with which to form a wireless connection through which to transfer information. In an embodiment, the user of the broadcasting wireless communication device 102A enables a file sharing communication service by providing a setting through the IO block 408A of the broadcasting wireless communication device 102A, e.g., as indicated by action ① in FIG. 5. The application processor 406A of the broadcasting wireless communication device 102A can configure the WPAN wireless circuitry 404A to enable broadcast transmission of one or more messages, e.g., advertising messages, in accordance with a WPAN wireless communication protocol. The application processor 406A of the broadcasting wireless communication device 102A can also configure the WLAN wireless circuitry 402A and/or the WPAN wireless circuitry 404A of the broadcasting wireless communication device 102A to listen for messages communicated in return from other wireless communication devices 102 in response to the broadcast advertising messages transmitted through the WPAN wireless circuitry 404A. Configuration of the WLAN wireless circuitry 402A and/or the WPAN wireless circuitry 404A by the application processor 406A can be indicated by the action ② shown in FIG. 5. The WPAN wireless circuitry 404A can transmit advertising messages in accordance with a WPAN wireless communication protocol, e.g., a BTLE WPAN wireless communication protocol, as indicated by action ③ in FIG. 5. The advertising messages broadcast by the WPAN wireless circuitry 404A of the broadcasting wireless communication device 102A can include information that identifies one or more of: a manufacturing company associated with the broadcasting wireless communication device 102A, a user of the broadcasting wireless communication device 102A, a wireless communication service offered by the broadcasting wireless communication device 102A, or aspects of the particular broadcasting wireless communication device 102A. In an embodiment, the advertising messages include a manufacturing identification field, a communication service identification field, and a user identification field.

As described above, the scanning wireless communication device 102B can listen for "advertising" messages by enabling a receive signal chain of the WPAN wireless circuitry 404B. In an embodiment, the WPAN wireless circuitry 404B receives and filters messages that are communicated according to a WPAN wireless communication protocol, e.g., a BTLE wireless communication protocol. Scanning for messages by the WPAN wireless circuitry 404B of the scanning wireless communication device 102B can be indicated by the action ④ in FIG. 5. A receive signal chain of the WPAN wireless circuitry 404B can filter received messages according to information contained in the received messages. In an embodiment, the scanning wireless communication device 102B identifies one or more messages that contain values that satisfy a set of matching filter criteria. In an embodiment, the WPAN wireless circuitry 404B retains (and/or continues to process) received messages in which select information matches a set of matching filter criteria and discards (and/or ignores) received messages that do not match the set of matching filter criteria. In an embodiment, the WPAN wireless circuitry 404B filters the received messages to retain (and/or further process) only those received messages that match particular values (or sets of values) for a manufacturing company and/or for a communication service. In an embodiment, the manufacturing company value can be determined by examining contents of a manufacturing identification field included in the received messages. In an embodiment, the communication service advertised by the broadcasting wireless communication device 102A can be determined by examining contents of a communication service identification field included in the received messages. In response to receiving a message that matches to a particular value (or set of values) contained in the manufacturing identification field and/or the communication service identification field, the WPAN wireless circuitry 404B can provide an indication to the application processor 406B of the scanning wireless communication device 102B. In an embodiment, the WPAN wireless circuitry 404B can extract additional information from one or more received messages that satisfy the set of matching filter criteria and can provide the extracted information to the application processor 406B. The WPAN wireless circuitry 404B can continue to process incoming received messages according to the WPAN wireless communication protocol, after providing the indication and information to the application processor 406B. The actions of the WPAN wireless circuitry 404B to filter, compare, and provide indications and/or information when a match occurs to the application processor 406B can be indicated by the action ⑤ in FIG. 5.

The application processor 406B of the scanning wireless communication device 102B can exit a power reduced or dormant state in response to receiving an indication from the WPAN wireless circuitry 404B of one or more received messages that include information with values that match a set of matching filter criteria. The application processor 406B can obtain additional information extracted by the WPAN wireless circuitry 404B contained in the received "matching" message. In some embodiments, the WPAN wireless circuitry 404B transfers a portion of the received "matching" message to the application processor 406B. In some embodiments, the WPAN wireless circuitry 404B transfers the entire received "matching" message to the application processor 406B for further processing. The application processor 406B can compare additional information extracted from the received "matching" message to information stored in (and/or associated with the scanning wireless communication device 102B). In an embodiment, the application processor 406B can compare a set of encrypted user identification values extracted from the received "matching" message to a local set of encrypted user identification values stored in (and/or associated with) the scanning wireless communication device 102B. The broadcasting wireless communication device 102A can include encrypted user identification information in the broadcast advertising message, e.g., a set of encrypted email addresses, a set of encrypted mobile device numbers, a set of encrypted login identifiers, or a combination of these. In some embodiments, the encrypted user identification information provided in the broadcast advertising message is derived from a contact list and/or an address book in (and/or associated with) the broadcasting wireless communication device 102A (and/or with a user thereof) The scanning wireless communication device 102B can compare a comparable local set of encrypted user identification values to the encrypted user identification information extracted from the received "matching" message to determine if the broadcasting wireless communication device 102A is "known" to the scanning wireless communication device 102B. In some embodiments, the local set of encrypted user identification information used for comparing by the scanning wireless communication device 102B is derived from a local contact list and/or a local address book in (and/or associated with) the scanning wireless communication device 102B (and/or with a user thereof.)

The encrypted user identification information included in the broadcast advertising message by the broadcasting wireless communication device 102A can identify uniquely a user of the broadcasting wireless communication device 102A and/or the broadcasting wireless communication device 102A itself. The scanning wireless communication device 102B can compare the encrypted user identification information associated with the broadcasting wireless communication device 102B to a local set of encrypted user identification information associated with the scanning wireless communication device 102A. In an embodiment, the local set of encrypted user identification information includes a set of encrypted email addresses, a set of encrypted mobile device numbers, a set of encrypted login identifiers, or a combination of these. In an embodiment, the email addresses, mobile device numbers, and/or login identifiers are included in a contact list and/or an address book of the scanning wireless communication device 102B. In an embodiment, encrypted user identification information includes cryptographic hashes of information stored in the contact list and/or the address book of the scanning wireless communication device 102B. The scanning wireless communication device 102B can "identify" the broadcasting wireless communication device 102A as "known" or "compatible" when at least a portion of the encrypted user identification information extracted from the received "matching" advertising message matches to a portion of the local encrypted user identification information. In a representative embodiment, the scanning wireless communication device 102B compares the cryptographic hashes of information stored in a contact list (or a select portion of the contact list) and/or an address book (or a select portion of the address book) to cryptographic hashes associated with the broadcasting wireless communication device 102B extracted from the received "matching" advertising message. Extracting and/or comparing information by the application processor 406B can be indicated by the action ⑥ in FIG. 5.

When the scanning wireless communication device 102B locates a compatible broadcasting wireless communication device 102A (e.g., by matching particular manufacturing identification field information) offering a compatible wireless communication service (e.g., by matching particular communication service identification field information) that is also known to the scanning wireless communication device 102B (e.g., by matching particular encrypted user identification field information), the application processor 406B can provide an indication of the located broadcasting wireless communication device 102A and/or the communication service offered to the user of the scanning wireless communication device 102B through the IO block 408B. In an embodiment, the application processor 406B provides user identification information and communication service information offered by the broadcasting wireless communication device 102A to the user of the scanning wireless communication device 102B through the IO block 408B, e.g., by displaying unencrypted user identification information associated with the broadcasting wireless communication device 102A and the communication service offered by the broadcasting wireless communication device 102A. In an embodiment, the user of the scanning wireless communication device 102B can respond to the displayed information by providing an acceptance or rejection of the offered wireless communication service offered by the broadcasting wireless communication device 102A. Display of information through the IO block 408B and reception of user input in response to the display of information through the IO block 408 can be indicated by the action ⑦ in FIG. 5.

The application processor 406B can enable the WLAN wireless circuitry 402B of the scanning wireless communication device 102B to establish a connection with the broadcasting wireless communication device 102A in response to receiving an acceptance from the user of the scanning wireless communication device 102B through the IO block 408B. In an embodiment, the application processor 406B can extract information from the received "matching" message to assist with establishing the connection to the broadcasting wireless communication device 102A through the WLAN wireless circuitry 402B. Enabling the WLAN wireless circuitry 402B to establish a connection in accordance with a WLAN wireless communication protocol to the broadcasting wireless communication device 102A can be indicated by the action ⑧ in FIG. 5.

The WLAN wireless circuitry 402A of the broadcasting wireless communication device 102A can respond to the WLAN wireless circuitry 402B of the scanning wireless communication device 102B to establish a direct peer-to-peer WLAN connection, which can be indicated by the action ⑨ in FIG. 5. The application processor 406A of the broadcasting wireless communication device 102A can communicate with the application processor 406B of the scanning wireless communication device 102B in order to establish an application layer connection over the direct peer-to-peer WLAN connection through which information can be transferred from the broadcasting wireless communication device 102A to the scanning wireless communication device 102B, e.g., using the communication service indicated in the broadcast advertising message.

The sequence of actions 500 indicated in FIG. 5 can provide for a method and/or a mechanism to locate compatible wireless communication devices 102 with which to transfer information. The scanning wireless communication device 102B can remain in a power reduced state with only portions of the WPAN wireless circuitry 404B enabled to scan for messages and compare information in received messages to filter out extraneous messages and extract useful information to provide to the application processor 406B when a match that satisfies a set of matching filter criteria occurs. The application processor 406B can process additional information from the received messages, and when a match occurs alert a user of the scanning wireless communication device 102B. In response to acceptance from the user of the scanning wireless communication device 102B, the application processor can enable the WLAN wireless circuitry 402B to establish a WLAN connection with the broadcasting wireless communication device 102A. The received messages can include information to assist with setting up a WLAN connection to the broadcasting wireless communication device 102A. The WLAN wireless circuitry 402A of the broadcasting wireless communication device 102A can be ready to establish the WLAN connection to the scanning wireless communication device 102B. Thus, in some embodiments, the WLAN wireless circuitries 402A/402B can be enabled when a compatible match occurs.

Figure 6:
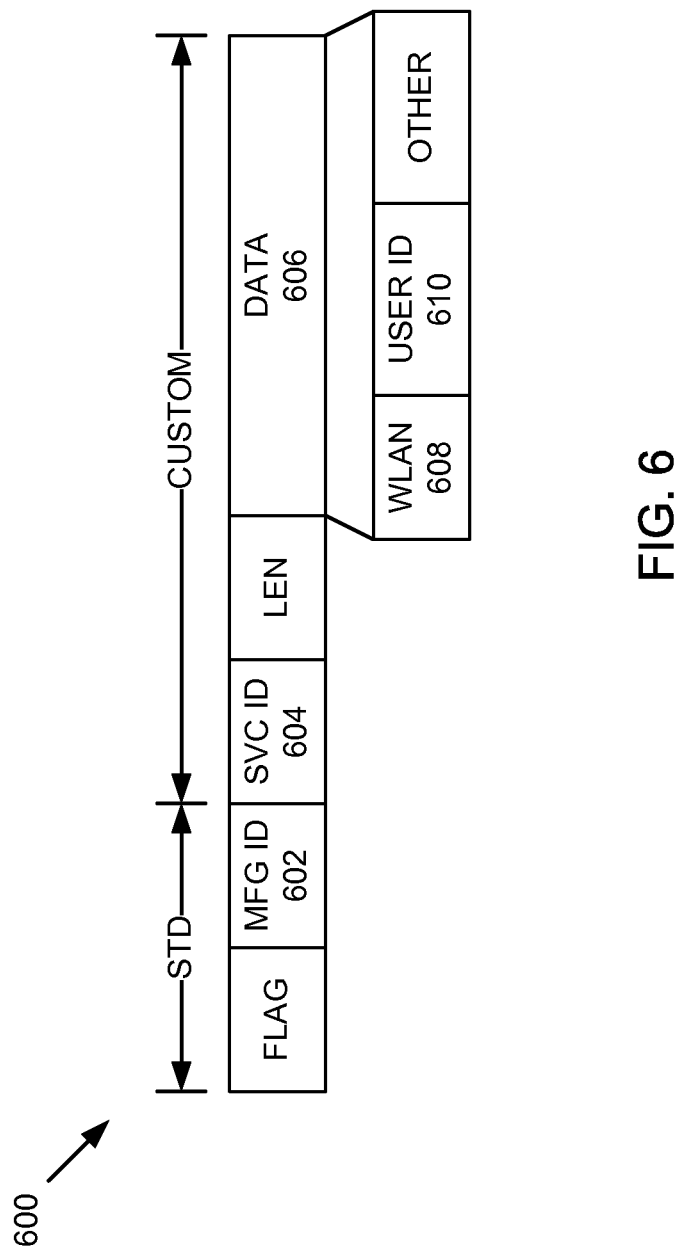
FIG. 6 illustrates a representative format for a message communicated through a wireless network to advertise information to compatible wireless communication devices in accordance with some embodiments.

FIG. 6 illustrates a representative format for an advertising message 600 communicated through a wireless network to advertise information to compatible wireless communication devices 102. The advertising message 600 can be transmitted by the broadcasting wireless communication device 102A and received by the scanning wireless communication device 102B. The advertising message 600 can include a standardized initial set of information fields, e.g., a flag or preamble followed by a manufacturing identification (MFG ID) field 602. In an embodiment, the advertising message 600 is formatted in accordance with a Bluetooth wireless communication protocol, e.g., a BTLE wireless communication protocol. The advertising message 600 can also include a customized set of information fields, e.g., a communication service identification (SVC ID) field 604, a length (LEN) field, and a data information field 606. The data information field 606 of the advertising message 600 can include one or more fields that can assist in determining compatibility between wireless communication devices 102 and/or for establishing connections between compatible wireless communication devices 102. The data field 606 can include information for assisting to establish a wireless local area network connection in a WLAN field 608. The data field 606 can also include encrypted user identification information in a USER ID field 610. The data field 606 can also include other information in one or more additional fields illustrated as an OTHER field in FIG. 6. In an embodiment, WPAN wireless circuitry 404B, e.g., a BLTE WPAN wireless receiver, in a scanning wireless communication device 102B can scan for messages that are formatted in accordance with a WPAN wireless communication protocol. The WPAN wireless circuitry 404B of the scanning wireless communication device 102B can retain messages that include particular values for the MFG ID field 602 and discard (or ignore) messages that do not include the particular values. In an embodiment, the scanning wireless communication device 102B can filter received messages for those that satisfy a set of filter matching criteria, e.g., having particular values in one or more of the fields. In some embodiments, the scanning wireless communication device 102B can retain messages from broadcasting wireless communication devices 102B for a particular manufacturing company (or set of manufacturing companies) and ignore one or more other messages. In an embodiment, the MFG ID field 602 includes information formatted according to a BTLE wireless communication protocol, e.g., a value that corresponds to a particular company as specified by the Bluetooth SIG. In an embodiment, the MFG ID field 602 can indicate the broadcasting wireless communication device 102A is associated with a manufacturing company incorporated as Apple Inc. In an embodiment, the scanning wireless communication device 102B searches for messages from broadcasting wireless communication devices having a MFG ID field 602 value that matches to a manufacturing company associated with the scanning wireless communication device 102B. In an embodiment, the WPAN wireless circuitry 404B of the scanning wireless communication device 102B can compare values contained in the SVC ID field 604 to a set of one or more communication service values to determine if the scanning wireless communication device 102B supports the advertised communication service as indicated in the SVC ID field 604 of the advertising message broadcast by the broadcasting wireless communication device 102A. In an embodiment, the WPAN wireless circuitry 404B of the scanning wireless communication device 102B can retain messages that match particular values for the SVC ID field 604 in addition to matching the MFG ID field 602. In an embodiment, the particular values included in the SVC ID field 604 can indicate a particular file sharing service, a particular printing service, a particular media streaming service, or a combination of these. In an embodiment, the SVC ID field 604 can indicate an AirDrop®, AirPrint™, or AirPlay® communication service provided by software on products of Apple Inc.

As described herein, the WPAN wireless circuitry 404B of the scanning wireless communication device 102B can provide the received message (when a match of the MFG ID field 602 and/or the SVC ID field 604 occurs), or portions of the received message, to the application processor 406B. The application processor 406B can extract and/or examine additional information in the received message, e.g., contained in a custom data field 606. In an embodiment, the application processor 406B analyzes information in the USER ID field 610, e.g., comparing encrypted user identification information contained in the USER ID field 610 to local encrypted user identification information. In an embodiment, the USER ID field 610 of the message 600 includes cryptographic hashes of information about the broadcasting wireless communication device 102A and/or a user of the broadcasting wireless communication device 102A. In an embodiment, the USER ID field 610 includes cryptographic hashes of email addresses, mobile directory numbers, and/or login identifiers associated with the broadcasting wireless communication device 102A and/or a user thereof. In an embodiment, the USER ID field 610 includes encrypted information derived from a contact list and/or an address book stored in and/or associated with the broadcasting wireless communication device 102A (and/or a user thereof.) In an embodiment, the user of the broadcasting wireless communication device 102A specifies information to include in the USER ID field 610 of the advertising messages 600. In an embodiment, software executed on the application processor 406A encrypts one or more of: an email address, a mobile directory number, or a login identifier to include in the USER ID field 610 of the advertising message 600. The application processor 406B of the scanning wireless communication device 102B can compare the encrypted information extracted from the USER ID field 610 to a set of encrypted information stored in (and/or associated with) the scanning wireless communication device 102B and/or a user thereof. In an embodiment, software executed on the application processor 406B encrypts one or more of: a set of email addresses, a set of mobile directory numbers, or a set of login identifiers for a contact list and/or an address book stored in and/or associated with the scanning wireless communication device 102B. In an embodiment, the application processor 406B forms a set of cryptographic hashes associated with information contained in or derived from a contact list and/or an address book of the scanning wireless communication device 102B. In an embodiment, the application processor 406B of the scanning wireless communication device 102B compares cryptographic hashes extracted from the USER ID field 610 of the received message (and therefore associated with the broadcasting wireless communication device 102A) to cryptographic hashes for information of the contact list and/or address book of the scanning wireless communication device 102B. In some embodiments, when at least a portion of the cryptographic hashes extracted from the USER ID field 610 match a portion of the cryptographic hashes associated with the scanning wireless communication device 102B, the application processor 406B informs the user of the scanning wireless communication device 102B, e.g., through a IO block 408B, of a nearby compatible broadcasting wireless communication device 102A that is offering a compatible wireless communication service, e.g., as indicated in the SVC ID field 604, to the scanning wireless communication device 102B, and is "known" to the scanning wireless communication device 102B, e.g., as indicated by information in the USER ID field 610.

Figure 7:
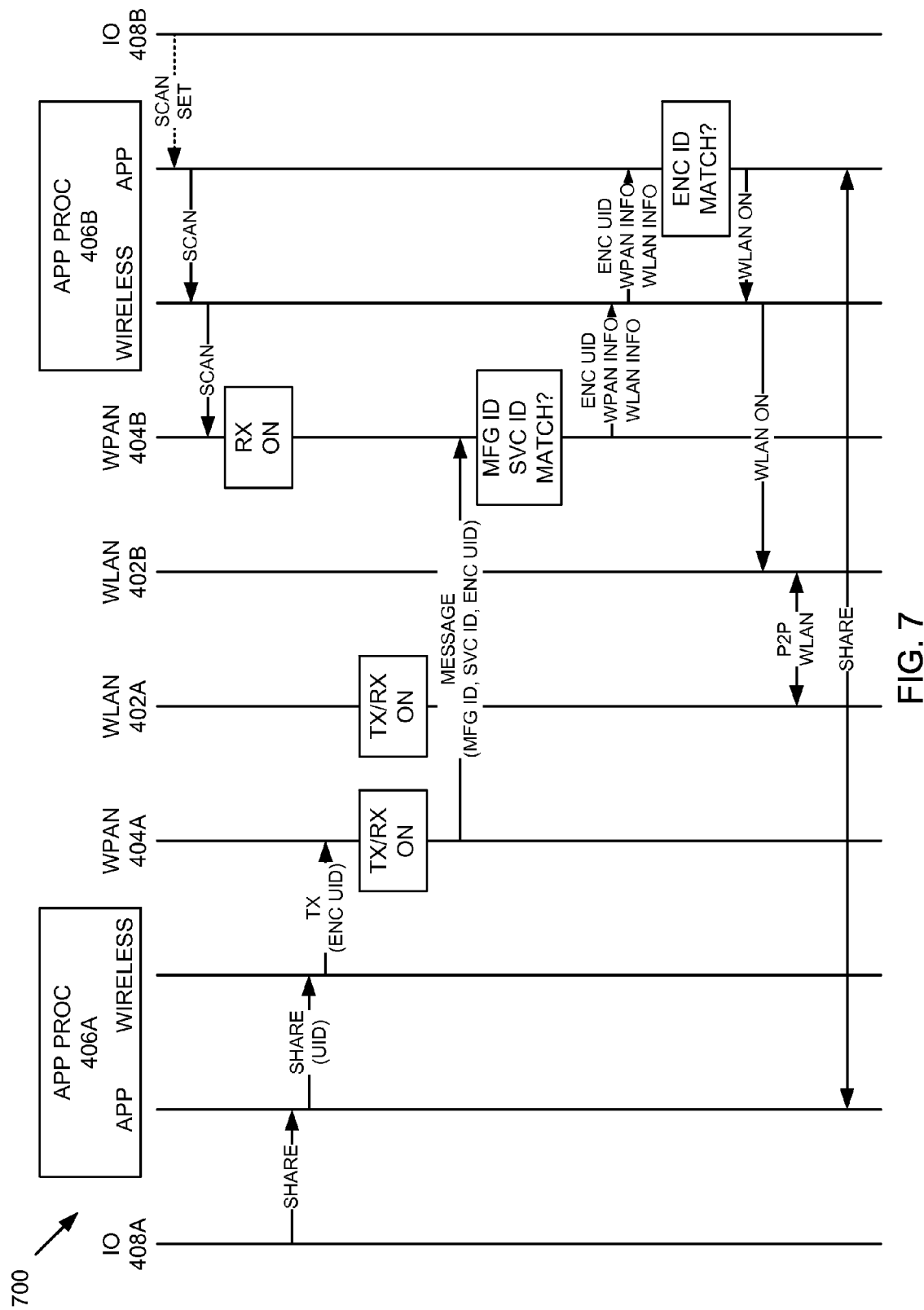
FIG. 7 illustrates a communication flow chart between two wireless communication devices to discover each other using a first wireless network and subsequently to establish a connection and share data using a second wireless network in accordance with some embodiments.

FIG. 7 illustrates a communication flow chart 700 between two wireless communication devices 102A and 102B to discover each other using a first wireless network and subsequently to establish a connection and share data using a second wireless network. In a first step, in some embodiments, a user of a scanning wireless communication device 102B can provide an input through an IO block 408B that can determine scanning settings for the scanning wireless communication device 102B. In an embodiment, the user determines whether a receive signal chain of the WPAN wireless circuitry 404B in the scanning wireless communication device 102B is enabled. The user inputs can be received through the IO block 408B and interpreted by software (e.g., by elements of an operating system and/or an application) in the application processor 406B of the scanning wireless communication device 102B. As illustrated in FIG. 7, an application level (or operating system) level setting can indicate enabling a scanning function which can be communicated to a lower level wireless software function that can communicate with the WPAN wireless circuitry 404B of the scanning wireless communication device 102B. A receive signal chain of the WPAN wireless circuitry 404B can be turned on to receive messages (e.g., as indicated by the "RX ON" label in FIG. 7). In an embodiment, the receive signal chain can listen for advertising messages according to a BTLE wireless communication protocol. In some embodiments, enabling the WPAN wireless circuitry 404B can occur without user input (e.g., based on default settings and/or operating conditions of the scanning wireless communication device 102B).

In parallel to actions undertaken by the scanning wireless communication device 102B, a user of a broadcasting wireless communication device 102A can provide input through an IO block 408A indicating availability of a wireless communication service, e.g., by starting a file sharing service (or other communication service) as indicated by the "SHARE" label in FIG. 7. In an embodiment, the user selects to share a particular set of information, e.g., one or more files, available on (or associated with) the broadcasting wireless communication device 102A. An application (and/or operating system software) executed by the application processor 406A of the broadcasting wireless communication device 102A, in response to the user input received through the IO block 408A, can provide user identification (UID) information to associate with an advertising message to broadcast availability of the wireless communication service. In an embodiment, the application processor 406A of the broadcasting wireless communication device 102A determines the UID information based on a user of the scanning wireless communication device 102A (e.g., a registered owner, default user information, a login identifier, a mobile directory number, an email address, or other information by which a user can be uniquely identified). In an embodiment, the UID information includes a set of UID information (e.g., a set of email addresses, a set of mobile directory numbers, a set of login identifiers, or a combination of these.)

In an embodiment, the application and/or operating system software provides the UID information to a wireless proxy application software function. The wireless proxy application software function, executing on the application processor 406A, can provide an encrypted version of the UID information along with an indication to transmit the encrypted UID information to the WPAN wireless circuitry 404A of the broadcasting wireless communication device 102A. In an embodiment, the encrypted version of the UID information includes cryptographic hashes of the UID information. The application processor 406A can enable the WPAN wireless circuitry 404A and/or the WLAN wireless circuitry 402A (or portions thereof) of the broadcasting wireless communication device 102A to operate. The WPAN wireless circuitry 404A can format and broadcast a message (or obtain from the application processor 406A a formatted message) to advertise availability of the wireless communication service. In an embodiment, the message is formatted and broadcast in accordance with a WPAN wireless communication protocol, e.g., a BTLE wireless communication protocol. In an embodiment, the broadcast advertising message includes all or part of the encrypted UID information in a user identification field of the message. In an embodiment, the message also includes a communication service identification field that includes a value indicating the wireless communication service available from the broadcasting wireless communication device 102A. In an embodiment, the message also includes a manufacturing identification field that includes a value identifying a manufacturing company associated with the broadcasting wireless communication device 102A. In an embodiment, the value in the manufacturing identification field identifies that the broadcasting wireless communication device 102A is associated with the manufacturing company Apple Inc.

The WPAN wireless circuitry 404B of the scanning wireless communication device 102B can receive the broadcast advertising message transmitted by the broadcasting wireless communication device 102A and can compare information contained in the broadcast advertising message to particular values to determine whether a match based on a set of matching filter criteria occurs. In an embodiment, the WPAN wireless circuitry 404B compares values in the manufacturing identification field and the communication service identification field to determine compatibility of capabilities of the scanning wireless communication device 102B to the broadcasting wireless communication device 102A. In an embodiment, the WPAN wireless circuitry 404B ignores received advertising messages that do not match certain values in the manufacturing identification field and/or the communication service identification field. In an embodiment, the WPAN wireless circuitry 404B retains received messages that match certain values in the manufacturing identification field, the communication service identification field or both fields. In an embodiment, the WPAN wireless circuitry 404B only retains received messages that match certain values in both the manufacturing identification field and the communication service identification field.

In an embodiment, the WPAN wireless circuitry 404B provides an indication of a matching advertising message received by the WPAN wireless circuitry 404B to the application processor 406B of the scanning wireless communication device 102B. The WPAN wireless circuitry 404B can provide all or part of the matching advertising message to the application processor 406B. In an embodiment, the WPAN wireless circuitry 404B provides encrypted user information extracted from the user identification field of the matching advertising message to the application processor 406B of the scanning wireless communication device 102B. In some embodiments, the WPAN wireless circuitry 404B provides additional information extracted from the advertising message, e.g., information about the WLAN wireless circuitry 402A of the broadcasting wireless communication device 102A included in the advertising message that can assist in establishing a WLAN connection between the scanning wireless communication device 102B and the broadcasting wireless communication device 102A. In some embodiments, the WPAN wireless circuitry 404B also provides supplemental information associated with the matching advertising message, e.g., a measure of signal strength and/or signal quality of the matching advertising message, which can provide indirectly information about the signal path between the broadcasting wireless communication device 102A and the scanning wireless communication device 102B to the application processor 406B of the scanning wireless communication device 102B. In some embodiments, the WPAN wireless circuitry 404B of the scanning wireless communication device 102B receives broadcast advertising messages from one or more different broadcasting wireless communication devices 102A and provides the supplemental information along with information extracted from matching advertising messages to the application processor 406B of the scanning wireless communication device 102B. In some embodiments, the application processor 406B of the scanning wireless communication device 102B estimates proximity of the broadcasting wireless communication device 102A based at least in part on the supplemental information. In some embodiments, the WPAN wireless circuitry 404B and/or other wireless circuitry in the scanning wireless communication device 102B can use the supplemental information to determine characteristics of a communication path between the scanning wireless communication device 102B and the broadcasting wireless communication device 102A.

A wireless proxy software function and/or an application level software function, executed by the application processor 406B of the scanning wireless communication device 102B, can compare the encrypted user identification information extracted from the matching advertising message to a local set of encrypted user identification information stored in (and/or associated with) the scanning wireless communication device 102B. The application processor 406B can determine, using at least in part the encrypted user identification information extracted from the matching advertising message received by the WPAN wireless circuitry 404B, whether the broadcasting wireless communication device 102A is compatible with (and/or known by) the scanning wireless communication device 102B (or a user thereof). In a representative embodiment, the application processor 406B compares encrypted versions of information contained in a contact list and/or an address book of the scanning wireless communication device 102B to the encrypted user identification information extracted from the matching advertising message received from the broadcasting wireless communication device 102A. In an embodiment, the application processor determines a match occurs when at least one encrypted user identification element (e.g., a cryptographic hash of an email address, mobile directory number, login ID, or a combination of these) matches an encrypted user identification element stored in and/or associated with the scanning wireless communication device 102B, (e.g., a cryptographic hash of an email address, mobile directory number, or login ID of a contact list, an address book, or portions thereof). When the application processor 406B determines a match occurs, e.g., that a compatible broadcasting wireless communication device 102A has been located, that a compatible wireless communication service is available from the broadcasting wireless communication device 102A, and that the broadcasting wireless communication device 102A (and/or a user thereof) is known to the scanning wireless communication device 102B (and/or to a user thereof), the application processor 406B can enable WLAN wireless circuitry 402B of the scanning wireless communication device 102B. In some embodiments, comparison of all or part of the encrypted information extracted from the matching advertising message to the local set of encrypted user information in the scanning wireless communication device 102B can be offloaded from the application processor 406B to wireless circuitry in the scanning wireless communication device 102B. In some embodiments, the wireless circuitry can transition the application processor 406B for a dormant state to an "awake" state when the wireless circuitry determines a match occurs, e.g., based on comparison of all of part of the encrypted user identification information extracted from an advertising message to the local set of encrypted user identification information.

The WLAN wireless circuitries 402A/402B of the wireless communication devices 102A/102B can subsequently establish a WLAN connection through which information can be transferred. In an embodiment, the application processor 406B can use information about the WLAN wireless circuitry 402A of the broadcasting wireless communication device 102A extracted from the advertising message to assist in establishing the WLAN connection. In an embodiment, the advertising message can include a MAC address for the WLAN wireless circuitry 402A of the broadcasting wireless communication device 102A and/or a radio frequency channel identifier for the WLAN wireless circuitry 402A. In an embodiment, an application level connection for a communication service can be established between applications executing on the application processors 406A/406B of the respective wireless communication devices 102A/102B. In an embodiment, the communication service established can be specified by the communication service identification field (SVC ID) of the matching advertising message received by the scanning wireless communication device 102B from the broadcasting wireless communication device 102A. In an embodiment, the WLAN connection is a peer-to-peer WLAN connection established between the wireless communication devices 102A/102B. In an embodiment, the application level connection provides for a communication service to transfer information between the wireless communication devices 102A/102B. In a representative embodiment, the application processors 406A/406B of the wireless communication devices 102A/102B execute software for a minimal or zero configuration networking that provides for service discovery through the WLAN connection, e.g., as offered by Bonjour software provided by Apple Inc. In a representative embodiment, a user of the scanning wireless communication device 102B interacts with a user of the broadcasting wireless communication device 102A to transfer information through a communication service indicated by the communication service identification field (SVC ID) of the advertising message received through the WPAN connection and subsequently discovered through the WLAN connection. Representative communication services include a file sharing service, e.g., AirDrop®, a printing service, e.g., AirPrint™, or a media streaming service, e.g., AirPlay®, (provided by software operating on products of Apple Inc.), and/or other communication services. In some embodiments, for a file sharing service, a user of one of the wireless communication devices 102A/102B can select a file through an IO block 408A/408B, and the selected file can transfer between the wireless communication devices 102A/102B. In some embodiments, for a printing service, a user of one of the wireless communication devices 102A/102B can select a file through an IO block 408A/408B, and the selected file can transfer to be printed. In some embodiments, for a media streaming service, a user of one of the wireless communication devices 102A/102B can select a file or other indicator of a media stream (e.g., an audio stream, a video stream, or equivalent) and transfer of the media stream can be initiated. Additional representative communication services can include gaming and tethering services that can operate over connections between the wireless communication devices 102A/102B.

Figure 8:
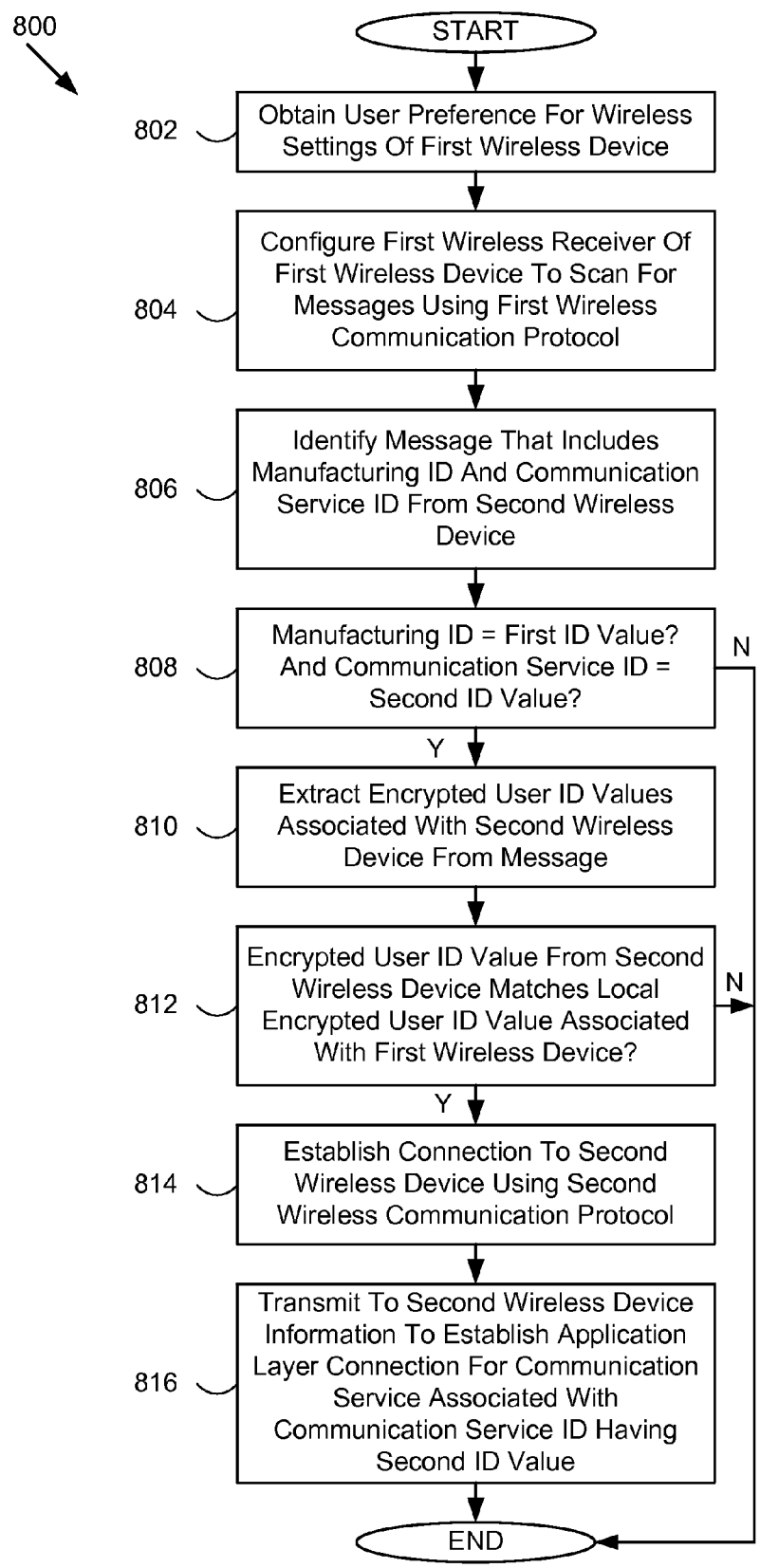
FIG. 8 illustrates a flowchart according to an example method to discover a wireless communication device and to establish a connection and transfer information in accordance with some embodiments.

FIG. 8 illustrates a flowchart 800 according to an example method for discovering a wireless communication device 102 and using a wireless network to establish a connection and to transfer information. In a first step 802, in some embodiments, a first wireless communication device 102B can obtain one or more user preferences for settings of wireless capabilities of the first wireless communication device 102B. In some embodiments, the settings directly control operating states of wireless local area network (WLAN) wireless circuitry, wireless personal area network (WPAN) wireless circuitry, and/or wireless wide area network (WWAN) wireless circuitry of the first wireless communication device 102B. In an embodiment, the settings indirectly control operating states of one or more wireless circuitries of the first wireless communication device 102B, e.g., by providing a balance between power savings and responsiveness to user actions. In a second step 804, a first wireless circuitry of the first wireless communication device 102B is configured to scan for messages communicated in accordance with a first wireless communication protocol. In a representative embodiment, the first wireless communication protocol is a WPAN wireless communication protocol, e.g. a Bluetooth Low Energy (BTLE) wireless communication protocol. In a subsequent step 806, the first wireless communication device 102B identifies a message received during scanning that includes a manufacturing identification field and a communication service identification field, the message originating from a second wireless communication device 102A. In step 808, the first wireless communication device 102B determines whether particular values included in the manufacturing identification field and in the communication service identification field match to a first identification value and to a second identification value respectively. In an embodiment, the first ID value identifies the second wireless communication device 102A as a device associated with a particular manufacturing company, e.g., the manufacturing company Apple Inc. In an embodiment, the first ID values identifies the second wireless communication device 102A as a device associated with a particular manufacturing company that is also associated with the first wireless communication device 102B. In an embodiment, the second ID value identifies a data sharing communication service advertised by the message received from the second wireless communication device 102A. In some embodiments, the data sharing communication service is a file sharing service, a file printing service, or a media streaming service. When the particular values of the manufacturing identification field and the communication service identification field do not match the first and second identification values respectively, the method ends. When the particular values of the manufacturing identification field and the communication service identification field do match the first and second identification values respectively, the first mobile wireless communication device 102B, in step 810, extracts one or more encrypted user identification values from a user identification field of the message received from the second wireless communication device 102A. In step 812, the first wireless communication device 102B compares the extracted encrypted user identification values received in the message from the second wireless communication device 102A to a set of local encrypted user identification values associated with the first wireless communication device 102B. In an embodiment, the set of encrypted user identification values extracted from the message correspond to a set of identifiers that uniquely identify a user of the second wireless communication device 102A, uniquely identify the second wireless communication device 102A, or uniquely identify both the user of the second wireless communication device 102A and the second wireless communication device 102A. In some embodiments, the set of identifiers include a set of electronic mail addresses, a set of mobile directory numbers, a set of login identifiers, or a combination of these. When at least one encrypted user identification value extracted from the message received from the second wireless communication device 102A matches to at least one local encrypted user identification value in the set of local encrypted user identification values associated with the first wireless communication device 102B, the first wireless communication device 102B can conclude that the second wireless communication device 102A (and/or a user thereof) is "known" to the first wireless communication device 102B (and/or to a user thereof). When the second wireless communication device 102A is "not known" to the first wireless communication device 102B, the method can end. When the second wireless communication device 102A is "known," in step 814, the first wireless communication device 102B can establish a connection to the second wireless communication device 102A, e.g., in accordance with a second wireless communication protocol. In a representative embodiment, the second wireless communication protocol is a WLAN wireless communication protocol. In some embodiments, the WLAN wireless communication protocol is a Wi-Fi wireless communication protocol. In some embodiments, the WLAN wireless communication protocol provides for a peer-to-peer WLAN connection between the first wireless communication device 102B and the second wireless communication device 102A. In some embodiments, establishing the connection in accordance with the second wireless communication protocol to the second wireless communication device 102A, includes waking radio frequency (RF) wireless circuitry in the first wireless communication device 102B from a dormant power-reduced state to an active state, and establishing a direct peer-to-peer WLAN connection through the RF wireless circuitry to the second wireless communication device 102A in accordance with the second wireless communication protocol. In some embodiments, in step 816, the first mobile wireless communication device 102B transmits to the second wireless communication device 102A information to establish an application layer connection for a communication service identified by the second identification value in the communication service identification field of the received message. In some embodiments, the application layer connection supports discovery of communication services and/or wireless communication devices to one another in order to transfer information, e.g., through a file sharing or other data sharing communication service.

Figure 9:
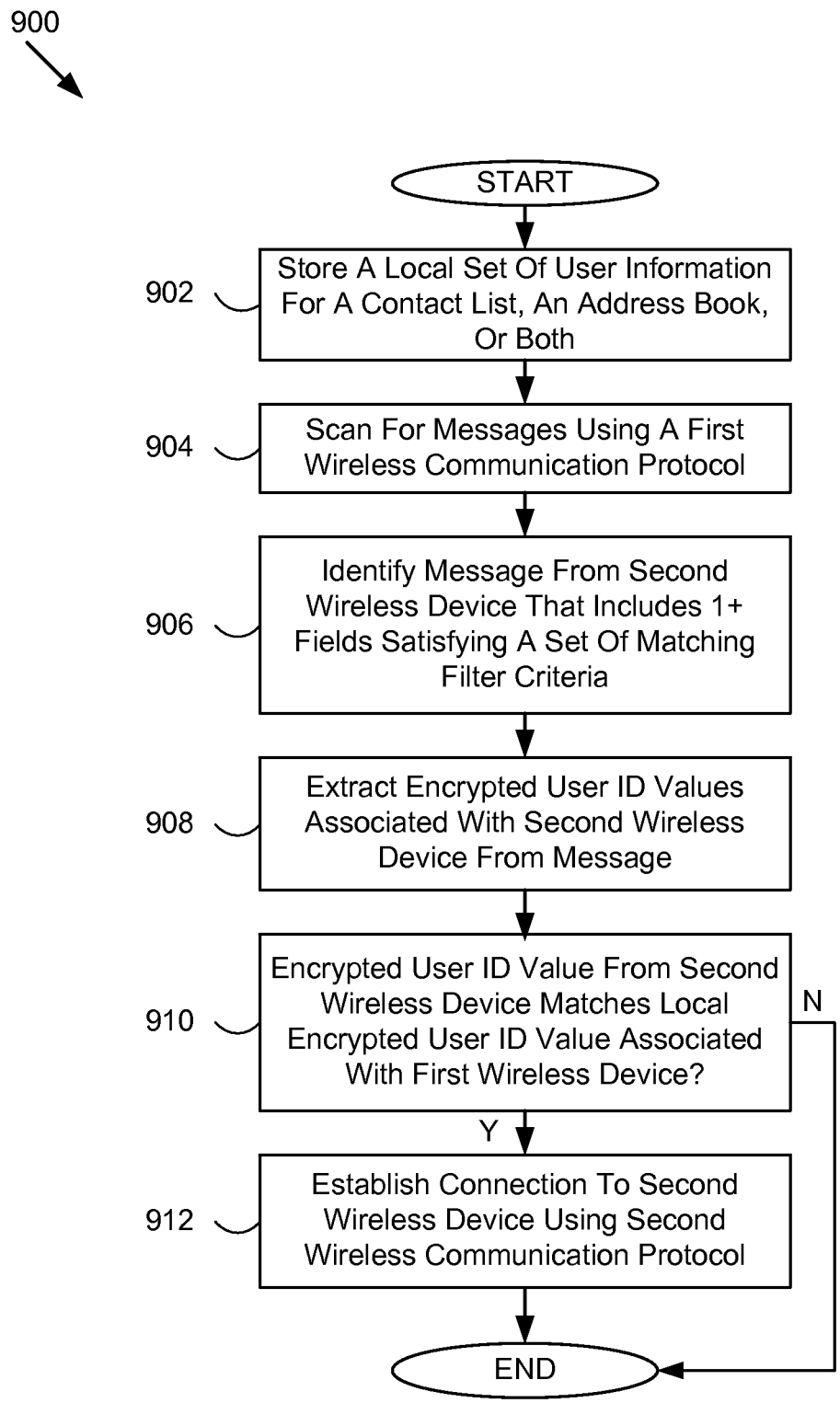
FIG. 9 illustrates a flowchart according to another example method to discover a wireless communication device and to establish a connection and transfer information in accordance with some embodiments.

FIG. 9 illustrates a flowchart 900 according to another example method for a first wireless communication device 102B to discover a second wireless communication device 102A, to establish a connection between them, and to transfer information between them. In an embodiment, the first wireless communication device 102B includes non-volatile storage, a processor (e.g., application processor 406), and wireless circuitry (e.g., WPAN wireless circuitry 404 and/or WLAN wireless circuitry 402). In step 902, the first wireless communication device 102B stores a local set of user information, all or at least a portion thereof, in the non-volatile storage (and/or in associated storage connected to the wireless communication device 102B). In some embodiments, the local set of user information corresponds to a contact list, an address book, or both. In some embodiments, all or portions of the local set of user information is stored in an unencrypted form, an encrypted form, or both. In some embodiments, the encrypted form includes cryptographic hashes of the user information. In step 904, the first wireless communication device 102B scans, using at least a first portion of the wireless circuitry, for messages communicated in accordance with a first wireless communication protocol. In step 906, the first wireless communication device 102B identifies a message received by the wireless circuitry from the second wireless communication device 102A. In some embodiments, the received message includes one or more fields containing values that satisfy a set of matching filter criteria. In some embodiments, the message is formatted according to the message format 600 illustrated in FIG. 6. In some embodiments, the set of matching filter criteria compare values contained in one or more of the fields, e.g., fields as illustrated in the message format 600 in FIG. 6. In some embodiments, the first wireless communication device 102B discards and/or ignores messages that do not satisfy the set of matching filter criteria. In step 908, the first wireless communication device 102B extracts a set of encrypted user identification values associated with the second wireless communication device 102A from the received message. In step 910, the first wireless communication device 102B compares the set of encrypted user identification values extracted from the message to an encrypted version of at least a portion of the local set of user information stored in the non-volatile storage. When a first encrypted user identification value, in the set of encrypted user identification values extracted from the message received from the second wireless communication device 102A, matches a second encrypted user identification value in the encrypted version of the at least a portion of the local set of user information, in step 912, the first wireless communication device 102B establishes, using at least a second portion of the wireless circuitry, a connection to the second wireless communication device 102A in accordance with the second wireless communication protocol. When the first encrypted user identification value, in the set of encrypted user identification values extracted from the message received from the second wireless communication device 102A, does not match the second encrypted user identification value in the encrypted version of the at least a portion of the local set of user information, the method ends.

Figure 10:
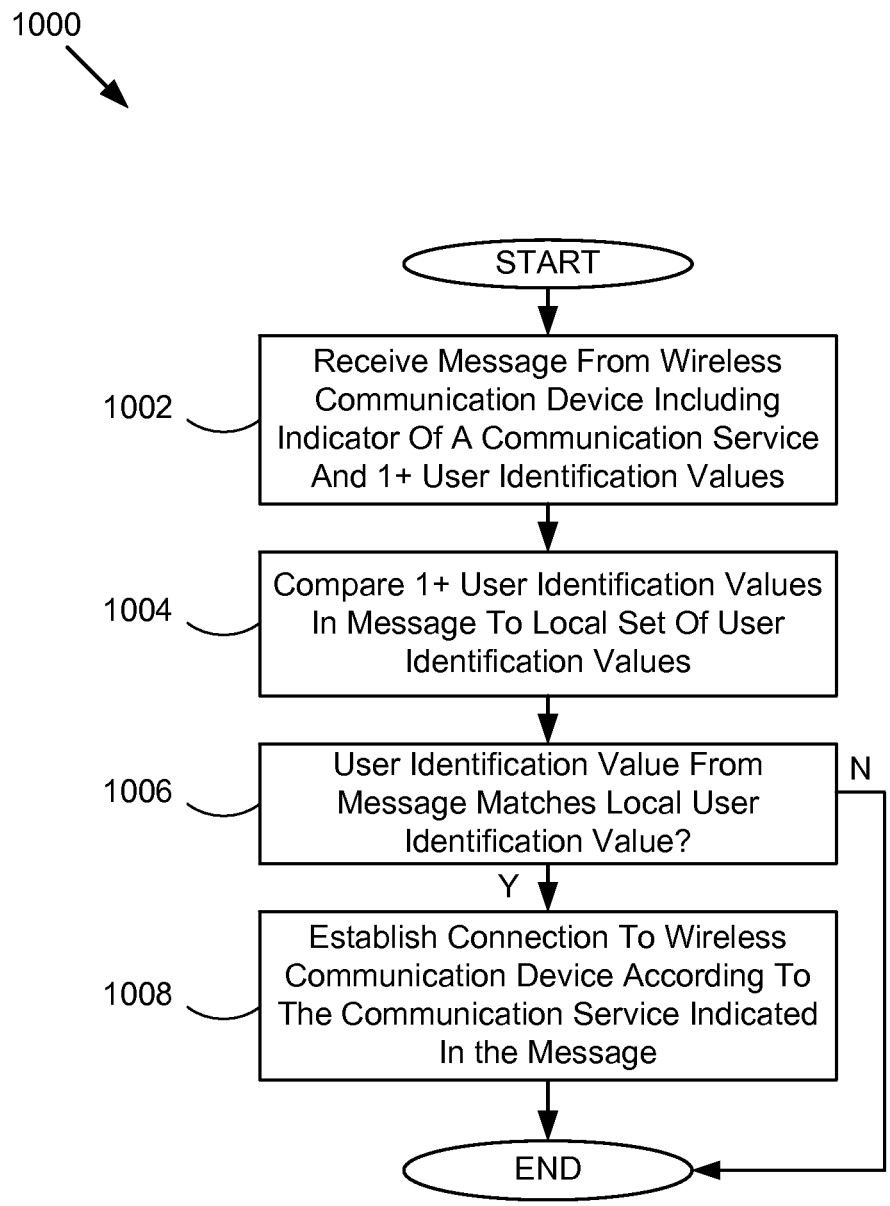
FIG. 10 illustrates a flowchart according to a further example method to discover a wireless communication device and to establish a connection in accordance with some embodiments.

FIG. 10 illustrates a further representative method 1000 to discover a wireless communication device and to establish a connection with the discovered wireless communication device. In step 1002, a scanning wireless communication device 102B receives a message from a broadcasting wireless communication device 102A. In some embodiments, the message includes an indicator of a communication service and one or more user identification values associated with the broadcasting wireless communication device 102A. In step 1004, the scanning wireless communication device 102B compares the one or more user identification values in the message to a local set of user identification values. In some embodiments, the local set of user identification values is associated with the scanning wireless communication device 102B and/or with a user thereof. In step 1006, the scanning wireless communication device 102B determines whether a first user identification value in the one or more user identification values matches a second user identification value in the local set of user identification values. When no match occurs, the method ends. When a match occurs, in step 1008, the scanning wireless communication device 102B establishes a connection to the broadcasting wireless communication device 102A and communicates with the broadcasting wireless communication device 102A according to the communication service indicated in the received message. In some embodiments, the message is broadcast and received in accordance with a Bluetooth Low Energy (BTLE) wireless communication protocol. In some embodiments, the connection established between the scanning wireless communication device 102B and the broadcasting wireless communication device 102A operates in accordance with a Wi-Fi wireless communication protocol.

Representative applications of systems, methods, apparatuses, and computer program products according to the present disclosure are described in this section hereinabove. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the detailed description provided, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Software, hardware, or a combination of hardware and software can implement various aspects of the described embodiments. The described embodiments can also be encoded as computer program code on a non-transitory computer readable medium. The non-transitory computer readable medium is any data storage device that can store data that can thereafter be read by a computer system. Examples of the non-transitory computer readable medium include read-only memory, random-access memory, CD-ROMs, DVDs, magnetic tape and optical data storage devices. The computer program code can also be distributed over network-coupled computer systems so that the computer program code is stored and executed in a distributed fashion.

The various aspects, embodiments, implementations or features of the described embodiments can be used separately or in any combination. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A method for use in a wireless communication device, wherein:
    the wireless communication device includes non-volatile storage, an application processor, and wireless circuitry;
    the wireless circuitry is capable of communicating in accordance with a first wireless communication protocol and in accordance with a second wireless communication protocol; and
    wherein the method comprises, at the wireless communication device:

storing in the non-volatile storage a local set of user information for a contact list, an address book, or both;

while the application processor and a second portion of the wireless circuitry each operate in corresponding power-reduced states:

scanning for messages in accordance with the first wireless communication protocol, using a first portion of the wireless circuitry;

determining whether a message, received via the first portion of the wireless circuitry from a second wireless communication device, includes one or more fields containing values that satisfy a set of matching filter criteria, including a manufacturing identification field having a value for the second wireless communication device that matches a corresponding manufacturing identifier for the wireless communication device; and extracting a set of encrypted user identification values associated with the second wireless communication device from the message, when the values for the one or more fields satisfy the set of matching filter criteria;

while the second portion of the wireless circuitry continues to operate in the corresponding power-reduced state and the values satisfy the set of matching filter criteria:

transitioning the application processor to a corresponding active state;

transferring to the application processor the set of encrypted user identification values extracted from the message;

comparing, using the application processor, the set of encrypted user identification values extracted from the message to an encrypted version of at least a portion of the local set of user information stored in the non-volatile storage; and when a first encrypted user identification value, in the set of encrypted user identification values extracted from the message received from the second wireless communication device, matches a second encrypted user identification value in the encrypted version of the at least a portion of the local set of user information:

transitioning the second portion of the wireless circuitry from the corresponding power-reduced state to the corresponding active state; and establishing, using the second portion of the wireless circuitry, a connection to the second wireless communication device in accordance with the second wireless communication protocol.

2. The method of claim 1, wherein the one or more fields of the message includes a communication service identification field; and wherein the set of matching filter criteria includes the communication service identification field containing an identification value associated with a particular communication service supported by the wireless communication device.

3. The method of claim 1, wherein the first wireless communication protocol is a wireless personal area network (WPAN) wireless communication protocol, and the second wireless communication protocol is a wireless local area network (WLAN) wireless communication protocol.

4. The method of claim 2, wherein the identification value identifies a data sharing communication service.

5. The method of claim 4, wherein the data sharing communication service includes a file sharing service, a file printing service, or a media streaming service.

6. The method of claim 2, further comprising:

transmitting information, to the second wireless communication device over the connection in accordance with the second wireless communication protocol, to establish an application layer connection for the particular communication service associated with the communication service identification field having the identification value.

7. The method of claim 1, wherein the set of encrypted user identification values, extracted from the message, corresponds to a set of identifiers that uniquely identify a user of the second wireless communication device, uniquely identify the second wireless communication device, or uniquely identify both the user of the second wireless communication device and the second wireless communication device.

8. The method of claim 7, wherein the set of identifiers comprise one or more of: a set of electronic mail addresses, a set of mobile directory numbers, or a set of login identifiers.

9. The method of claim 1, wherein establishing the connection to the second wireless communication device in accordance with the second wireless communication protocol comprises establishing a direct peer-to-peer wireless local area network connection to the second wireless communication device in accordance with the second wireless communication protocol, using at least the second portion of the wireless circuitry.

10. A wireless communication device comprising:

wireless circuitry configured to transmit and receive data in accordance with a first wireless communication protocol and in accordance with a second wireless communication protocol; and a processor coupled to the wireless circuitry, the processor configured to execute software to control the wireless communication device to:

while a second portion of the wireless circuitry operates in a power-reduced state:

scan for messages using a first portion of the wireless circuitry in accordance with the first wireless communication protocol;

determine whether a message, received via the first portion of the wireless circuitry from a second wireless communication device, includes one or more fields containing values that satisfy a set of matching filter criteria, including a manufacturing identification field having a value for the second wireless communication device that matches a corresponding manufacturing identifier for the wireless communication device and;

when the values for the one or more fields satisfy the set of matching filter criteria:

extract a set of encrypted user identification values associated with the second wireless communication device from the message; and compare the set of encrypted user identification values extracted from the message to a local set of encrypted user identification values associated with the wireless communication device; and when a first encrypted user identification value, in the set of encrypted user identification values extracted from the message, matches a second encrypted user identification value in the local set of encrypted user identification values:
transition the second portion of the wireless circuitry from the power-reduced state to an active state; and
establish a connection to the second wireless communication device in accordance with the second wireless communication protocol.

11. The wireless communication device of claim 10, wherein the values for the one or more fields satisfy the set of matching filter criteria includes the communication service identification field containing an identification value associated with a particular communication service supported by the wireless communication device.

12. The wireless communication device of claim 10, wherein the first wireless communication protocol is a Bluetooth Low Energy (BTLE) wireless personal area network (WPAN) wireless communication protocol, and the second wireless communication protocol is a wireless local area network (WLAN) Wi-Fi wireless communication protocol.

13. The wireless communication device of claim 11, wherein the identification value identifies a data sharing communication service.

14. The wireless communication device of claim 13, wherein the data sharing communication service includes a file sharing service, a file printing service, or a media streaming service.

15. The wireless communication device of claim 11, wherein the processor is configured to further control the wireless communication device to:
transmit to the second wireless communication device, over the connection in accordance with the second wireless communication protocol, information to establish an application layer connection for the particular communication service associated with the communication service identification field having the identification value.

16. The wireless communication device of claim 10, wherein the set of encrypted user identification values, extracted from the message, corresponds to a set of identifiers that uniquely identify a user of the second wireless communication device, uniquely identify the second wireless communication device, or uniquely identify both the user of the second communication wireless device and the second wireless communication device.

17. The wireless communication device of claim 16, wherein the set of identifiers comprise one or more of: a set of email addresses, a set of mobile directory numbers, or a set of login identifiers.

18. The wireless communication device of claim 10, wherein establish the connection to the second wireless communication device in accordance with the second wireless communication protocol comprises establish a direct peer-to-peer wireless local area network connection to the second wireless communication device using at least in part the second portion of the wireless circuitry in accordance with the second wireless communication protocol.

19. A non-transitory computer readable storage device configured to store software thereon, the software that, when executed by a processor, causes a second wireless communication device to:
while a second portion of wireless circuitry of the second wireless communication device operates in a power-reduced state:
receive a message from a first wireless communication device, via a first portion of the wireless circuitry using a first wireless communication protocol, the message including:
a manufacturing identifier value for the first wireless communication device,
an indicator of a particular communication service requested by the first wireless communication device and,
one or more user identification values associated with the first wireless communication device in one or more fields of the message;
when (i) the manufacturing identifier value for the first wireless communication device matches a corresponding manufacturing identifier for the second wireless communication device and (ii) the second wireless communication device supports the particular communication service, compare the one or more user identification values in the one or more fields in the message to a local set of user identification values stored in non-volatile storage; and
when a user identification value in the one or more user identification values matches a corresponding user identification value in the local set of user identification values:
transition the second portion of the wireless circuitry from the power-reduced state to an active state; and
establish a connection to the first wireless communication device, using a second wireless communication protocol, and
communicate with the wireless communication device according to the particular communication service.

20. The non-transitory computer readable storage device of claim 19, wherein the first wireless communication protocol comprises a Bluetooth Low Energy (BTLE) protocol, and the second wireless communication protocol comprises a Wi-Fi protocol.

* * * * *